United States Patent
Burshteyn

(10) Patent No.: US 10,664,439 B2
(45) Date of Patent: *May 26, 2020

(54) SECURITY VIA DYNAMIC DATA MOVEMENT IN A CLOUD-BASED ENVIRONMENT

(71) Applicant: CryptoMove, Inc., Palo Alto, CA (US)

(72) Inventor: Boris Burshteyn, Walnut Creek, CA (US)

(73) Assignee: CryptoMove, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,711

(22) Filed: Jul. 30, 2018

(65) Prior Publication Data

US 2018/0336209 A1    Nov. 22, 2018

Related U.S. Application Data

(63) Continuation-in-part of application No. 15/937,694, filed on Mar. 27, 2018, now Pat. No. 10,037,330, (Continued)

(51) Int. Cl.
*G06F 21/00* (2013.01)
*G06F 16/00* (2019.01)
(Continued)

(52) U.S. Cl.
CPC .......... *G06F 16/00* (2019.01); *G06F 21/6218* (2013.01); *H04L 9/3239* (2013.01);
(Continued)

(58) Field of Classification Search
CPC ... G06F 16/00; G06F 21/6218; H04L 9/3239; H04L 63/0428; H04L 67/06; H04L 2209/16

See application file for complete search history.

(56) References Cited

U.S. PATENT DOCUMENTS 7,707,117 B1   4/2010   Jimenez et al.
8,473,438 B2   6/2013   Potkonjak
(Continued)

FOREIGN PATENT DOCUMENTS

EP    2590451 A1    5/2013
JP    2004336702 A   11/2004
(Continued)

OTHER PUBLICATIONS

International Search Report and Written Opinion dated Sep. 1, 2016 of International Application No. PCT/2016/033098, filed May 18, 2016. (9 pages).

(Continued)

*Primary Examiner* — Mahfuzur Rahman
(74) *Attorney, Agent, or Firm* — Morrison & Foerster LLP

(57) ABSTRACT

Methods, apparatuses, and embodiments related to improving security of data that is stored at a data store distributed over a computer network or cloud-based environment. For example, source data to be protected is partitioned into multiple data files. Additionally, each file may be obfuscated, such as by being encrypted, to created multiple obfuscated data files. Information as to how each obfuscated data file was obfuscated is stored in an associated trace file. The multiple obfuscated data files are moved around a computer network or cloud-based environment. The cloud-based environment may include servers and data storage containers located in one or more cloud services.

34 Claims, 15 Drawing Sheets

Related U.S. Application Data which is a continuation-in-part of application No. 15/851,644, filed on Dec. 21, 2017, now Pat. No. 10,324,892, which is a continuation of application No. 15/668,459, filed on Aug. 3, 2017, now Pat. No. 9,898,473, which is a continuation of application No. 15/158,198, filed on May 18, 2016, now Pat. No. 9,753,931.

(60) Provisional application No. 62/163,804, filed on May 19, 2015.

(51) Int. Cl.
*H04L 29/06* (2006.01)
*H04L 29/08* (2006.01)
*G06F 21/62* (2013.01)
*H04L 9/32* (2006.01)

(52) U.S. Cl.
CPC .......... *H04L 63/0428* (2013.01); *H04L 67/06* (2013.01); *H04L 2209/16* (2013.01)

(56) References Cited

U.S. PATENT DOCUMENTS

| | | | |
|---|---|---|---|
| 8,904,279 B1* | 12/2014 | Bougon | G06F 21/6227 715/236 |
| 9,753,931 B2 | 9/2017 | Burshteyn | |
| 9,898,473 B2 | 2/2018 | Burshteyn | |
| 10,037,330 B1 | 7/2018 | Burshteyn | |
| 10,387,530 B2* | 8/2019 | Bougon | G06F 16/972 |
| 2004/0139340 A1 | 7/2004 | Johnson et al. | |
| 2005/0183072 A1 | 8/2005 | Horning et al. | |
| 2007/0061612 A1 | 3/2007 | Henderson et al. | |
| 2008/0162889 A1* | 7/2008 | Cascaval | G06F 9/3834 712/216 |
| 2012/0136846 A1* | 5/2012 | Song | H04L 45/7453 707/698 |
| 2012/0265737 A1 | 10/2012 | Potkonjak | |
| 2012/0272329 A1 | 10/2012 | Grammer et al. | |
| 2013/0019084 A1* | 1/2013 | Orchard | G06F 7/02 712/222 |
| 2014/0019756 A1 | 1/2014 | Krajec et al. | |
| 2014/0164352 A1* | 6/2014 | Denninghoff | H03H 9/02622 707/711 |
| 2014/0237614 A1 | 8/2014 | Irvine et al. | |
| 2014/0337985 A1 | 11/2014 | Muyshondt | |
| 2015/0106195 A1 | 4/2015 | Holman et al. | |
| 2015/0310219 A1 | 10/2015 | Haager et al. | |
| 2016/0342608 A1 | 11/2016 | Burshteyn | |
| 2017/0161128 A1 | 6/2017 | Hallowell et al. | |
| 2017/0357658 A1 | 12/2017 | Boris | |
| 2018/0137130 A1 | 5/2018 | Burshteyn | |
| 2018/0217997 A1 | 8/2018 | Burshteyn | |
| 2019/0227986 A1 | 7/2019 | Burshteyn | |
| 2019/0303349 A1 | 10/2019 | Burshteyn | |

FOREIGN PATENT DOCUMENTS

| | | |
|---|---|---|
| JP | 2007213405 A | 8/2007 |
| JP | 2010517119 A | 5/2010 |
| WO | 0004681 A1 | 1/2000 |

OTHER PUBLICATIONS

Non-Final Office Action dated Aug. 12, 2016 of U.S. Appl. No. 15/158,198 by Burshteyn, B., filed May 18, 2016.
Non-Final Office Action dated Mar. 22, 2018 of U.S. Appl. No. 15/851,644 by Burshteyn, B., filed Dec. 21, 2017.
Notice of Allowance dated May 9, 2017 of U.S. Appl. No. 15/158,198 by Burshteyn, B., filed May 18, 2016.
Notice of Allowance dated Oct. 17, 2017 of U.S. Appl. No. 15/668,459 by Burshteyn, B., filed Aug. 3, 2017.
Notice of Alowance dated Jun. 4, 2018 of U.S. Appl. No. 15/937,694 by Burshteyn, B., filed Mar. 27, 2018.
U.S. Appl. No. 15/158,198 by Burshteyn, B., filed May 18, 2016.
U.S. Appl. No. 15/668,459 by Burshteyn, B., filed Aug. 3, 2017.
U.S. Appl. No. 15/937,694 by Burshteyn, B., filed Mar. 27, 2018.
U.S. Appl. No. 15/851,644 by Burshteyn, B., filed Dec. 21, 2017.
Non-Final Office dated Mar. 22, 2018 of U.S. Appl. No. 15/851,644 by Burshteyn, B., filed Dec. 21, 2017.
Notice of Allowance dated Aug. 10, 2018 for Japanese Patent Application No. JP201756472, 3 pages.
Extended European Search Report dated Aug. 1, 2019, directed to EP Application No. 19165619.8; 7 pages.
Extended European Search Report dated Dec. 3, 2018, directed to EP Application No. 16797223.1; 12 pages.
Notice of Allowance dated Feb. 27, 2018, directed to IL Application No. 255745; 2 pages.
Burshteyn, Office Action dated Aug. 22, 2019, directed to U.S. Appl. No. 16/371,985; 9 pages.

\* cited by examiner

SECURITY VIA DYNAMIC DATA MOVEMENT IN A CLOUD-BASED ENVIRONMENT

CROSS REFERENCE TO RELATED APPLICATIONS

This application is a continuation-in-part of U.S. patent application Ser. No. 15/937,694, filed on Mar. 27, 2018, which is a continuation-in-part of U.S. patent application Ser. No. 15/851,644, filed on Dec. 21, 2017, which is a continuation of U.S. patent application Ser. No. 15/668,459, filed on Aug. 3, 2017, now U.S. Pat. No. 9,898,473, issued on Feb. 20, 2018, which is a continuation of U.S. patent application Ser. No. 15/158,198, filed on May 18, 2016, now U.S. Pat. No. 9,753,931, issued on Sep. 5, 2017, which application claims priority to U.S. Provisional Patent Application Ser. No. 62/163,804, filed on May 19, 2015, the entire contents of which are hereby incorporated by reference.

BACKGROUND

Security is an important concern in computer networks. One method of protecting data is to prevent unauthorized entry to a computer network via static security measures such as firewalls, passwords, dongles, physical keys, isolation, biometrics, or other measures. In spite of such measures, attackers have gained access to such theoretically secure networks. Once an attacker gains access to a network, the attacker is often able to obtain sensitive data, such as names, birth dates, social security numbers, bank account information, credit card information, intellectual property, etc. Attackers have successfully obtained such information from major corporations, such as retailers, health insurance providers, banks, etc. In some cases, an attacker is an "inside" attacker, such as an employee or some other person with authorized access to a secure network, a storage device. etc. In such cases, the attacker may be able to obtain sensitive data for nefarious purposes without needing to bypass any perimeter security that prevents unauthorized entry to the secure network.

BRIEF DESCRIPTION OF THE DRAWINGS

One or more embodiments are illustrated by way of example in the figures of the accompanying drawings, in which like references indicate similar elements.

DETAILED DESCRIPTION

Figure 1:
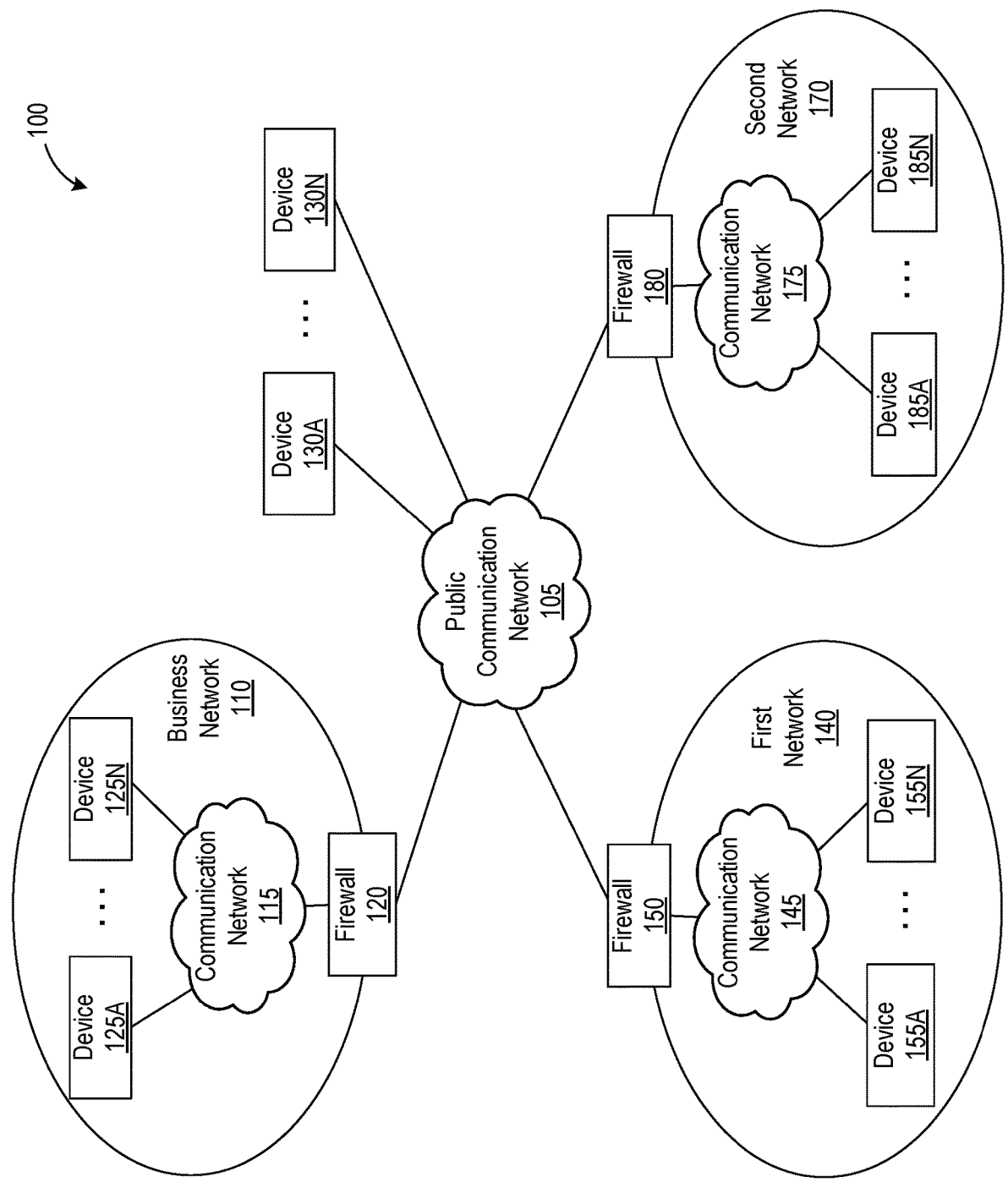
FIG. 1 is an illustration of a networking environment, consistent with various embodiments.

Introduced here is technology for improving security of data that is stored at a data store distributed over a computer network and/or a cloud-based environment. When users encrypt and save secret information in a computerized persistent data store, the stored data often becomes the target of cryptographic attacks. During an attack, obtaining data of a target secret, such as encrypted data that includes the target secret, is a necessary step in the sequence of deciphering attempts. The purpose of the attack may vary from decoding the encrypted data, to understanding the encryption method, to discovering encryption keys for use in subsequent attacks, etc. However, in all cases, identifying the data to target with an attack is a mandatory condition without which no cryptographic attack can start, much less advance in achieving its goals.

Without data identification, a cryptographic attack is futile. The disclosed technology enables a continuous concealment process that obfuscates stored data, changes data names and keeps moving the data around a distributed data store. Obfuscating data involves modifying the data in a way that increases the difficulty of determining the identity of a portion of the data. Because of this dynamic approach, unauthorized individuals, referred to herein as "attackers", are prevented from identifying target data by its name, size, content, access time, use patterns, etc. Therefore, an attacker is prevented from attacking target data simply because the attacker does not know which data to attack. Even if an attacker attempts to get a hold of an entire data store, the attacker's chances are slim when the data store is spread over a network. At the same time, a brute force attack on a data store protected via the disclosed technology is infeasible because of its high cost in both time and computing resources. In one example. just to locate a single protected file before mounting a cryptographic attack on that protected file, according to a calculation, one has to sift through about $2^{476}$ combinations of parts in a distributed data store of 10,000 files, where each file is split into 12 parts with 4 copies (3 for backup and redundancy purposes). Note how much higher this number is than the estimated number of atoms in the Universe, which is $2^{272}$. By continuously obfuscating and moving stored data, the disclosed technology makes identification of a particular protected data file practically impossible.

Just encrypting the protected file content and its name, without preventing its identification, still jeopardizes security. In a case where the attacker obtains encrypted data, the attacker might succeed in decrypting the encrypted data. Alternatively, the attacker might blackmail the encrypted data owner despite being unable to decrypt the data. Further, encryption methods considered safe today may become unsafe tomorrow because of the progress in the deciphering techniques. In some cases, an attacker may be able to apply vast amounts of computing resources, thereby enabling a successful brute force attack that results in the decryption of the protected file and access to its secret information. Additionally, an attacker may possess a secret algorithm that deciphers a seemingly impregnable encryption scheme. Therefore, having an attacker being able to identify the encrypted data is a serious risk in and of itself.

If the means of identification of a target file is unprotected, then an attacker may be able to choose a file just by the file name, size, content, access time, use pattern, etc. Note that sometimes an attacker is an outsider who procures help from an insider, or is himself an insider familiar with the data store. Such an insider may be able to identify the data based on his insider's knowledge. Also, in some cases it is enough to identify just a portion of the needed data as the data contains references to the remaining parts. Defeating an attack by denying the ability to isolate the target data serves as strong protection, not only against an external attacker who successfully bypassed access controls, but also against an internal attacker with the proper storage access, such as a malevolent system administrator.

Some techniques for protecting data rely on preventing an attacker from gaining access to the secure network at which the data is stored. However, as is apparent from the frequent news reports of computer network breaches at major corporations and businesses, such static perimeter network security techniques are inadequate in many cases.

The disclosed technology enables a computer system, for example a computer system of a business, to protect data even when an attacker has access to the network at which the data is stored. In an example, a business protects source data via a continuous concealment process that includes an obfuscation process and/or a data movement process. The obfuscation process involves a computer system of the business generating multiple obfuscated data files based on the source data, where all of the obfuscated data files are needed to regenerate the source data. The obfuscation process includes the computer system obfuscating and for partitioning the source data, which results in multiple files, and further includes the computer system obfuscating data of the multiple files, which results in the multiple obfuscated data files. Obfuscating data can include, for example, compressing, partitioning, encrypting, bit-scattering, cyclically exclusive-or'ing (XOR'ing), etc. the selected data, or adding random data to the selected data, among others.

In order for an attacker to successfully obtain access to data protected by the disclosed technology, the attacker must first gain access to all of the obfuscated data files for the protected data. Because the obfuscated data files are randomly named and are being randomly moved amongst a pool of computers (which may span the networks of multiple independent businesses), locating the obfuscated data files is prohibitively difficult, even for an inside attacker. Further, because all of the obfuscated data files are needed to regenerate the source data, any attacker that does not possess all of the obfuscated data files is effectively prevented from successfully regenerating the source data.

In an example that helps to demonstrate the difficulty of determining the source data for even an inside attacker, a business uses the disclosed technology to protect 10,000 source files that are stored in a data store or cloud-based environment. During the obfuscation process for each of the 10,000 source files, each source file is processed to create 12 obfuscated data files. For redundancy and backup reasons, an additional 3 versions of each of the obfuscated data files are also created, for a total of 4 obfuscated versions of each obfuscated data file, resulting in 4*12*10,000, or 480,000 obfuscated data files in the data store.

In order to start a cryptographic attack on selected source data, a correct set of 12 obfuscated data files needs to be identified and properly aligned. However, because the 480,000 obfuscated data files cannot be distinguished from each other based on file name, size, content, access time, use pattern, etc., an attacker would need to perform a brute force attempt to identify and order a unique set of 12 obfuscated data files needed to regenerate the selected source file. An analysis based on the number of obfuscated data files and the permutations of the obfuscated data files determined that there are $2^{476}$ possible ordered combinations of obfuscated data files. As previously discussed, this number is more than the estimated number of atoms in the Universe, which is $2^{272}$.

References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

Further, in this description the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

Also note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

FIG. 1 is an illustration of a networking environment 100, consistent with various embodiments. Network environment 100 includes three networks that are protected by a firewall, business network 110, first network 140, and second network 170. Each of the three networks includes a communication network that enables data communication between computing devices that are members of the network. For example, business network 110 includes communication network 115, which includes a plurality of devices (e.g., device 125A, device 125N, etc., referred to collectively as "devices 125"), which enables devices 125 to communicate with each other, with firewall 120, etc. First network 140 includes communication network 145, which includes a plurality of devices (e.g., device 155A, device 155N, etc., referred to collectively as "devices 155"), which enables devices 155 to communicate with each other, with firewall 150, etc. Second network 170 includes communication network 175, which includes a plurality of devices (e.g., device 185A, device 185N, etc., referred to collectively as "devices 185"). which enables devices 185 to communicate with each other, with firewall 180, etc.

The firewall of each of the three networks acts as a barrier to protect the network by keeping unauthorized network traffic out of the network. For example, firewall 120 protects business network 110, firewall 150 protects first network 140, and firewall 180 protects second network 170. Public communication network 105 is a public network, such as the Internet or any other public network. Public communication network 105, which includes a plurality of devices (e.g., device 130A, device 130N, etc.), enables devices 130, firewall 120, firewall 150, firewall 180, etc. to all communicate with each other.

Communication networks 115, 145, and 175, and public communication network 105, can be any type of network that enables data communication between computers. In various embodiments, one or more of communication networks 115, 145, and 175, and public communication network 105 are or include any of a local area network (LAN), a wide area network (WAN), a virtual private network (VPN), a private network, a public network, a cellular network, a short-range wireless network, a wireless local area network (WLAN), etc. The cellular network can be any of various types, such as code division multiple access (CDMA), time division multiple access (TDMA), global system for mobile communications (GSM), long term evolution (LTE), 2G, 3G, 4G, etc. The short-range wireless network, which is used for short-range wireless communications, can also be any of various types, such as Bluetooth, Bluetooth low energy (BLE), near field communication (NFC), etc. The WLAN can similarly be any of various types, such as the various types of IEEE 802.11 networks, among others. Public communication network 105 can be any type of public communication network, such as the Internet.

Devices 125, 130, 155, and 185 can be any type of computing device, such as a desktop computer, a laptop computer, a file server, a network attached storage (NAS) device, a mobile device, or a server, among others. Examples of mobile devices include smart phones, tablets, portable media devices, wearable devices, laptops, and other portable computers.

In some embodiments, first network 140 represents a first cloud storage or compute provider, and second network 170 represents a second cloud storage or compute provider, where the first and second cloud storage or compute providers are separate independent businesses.

Figure 2:
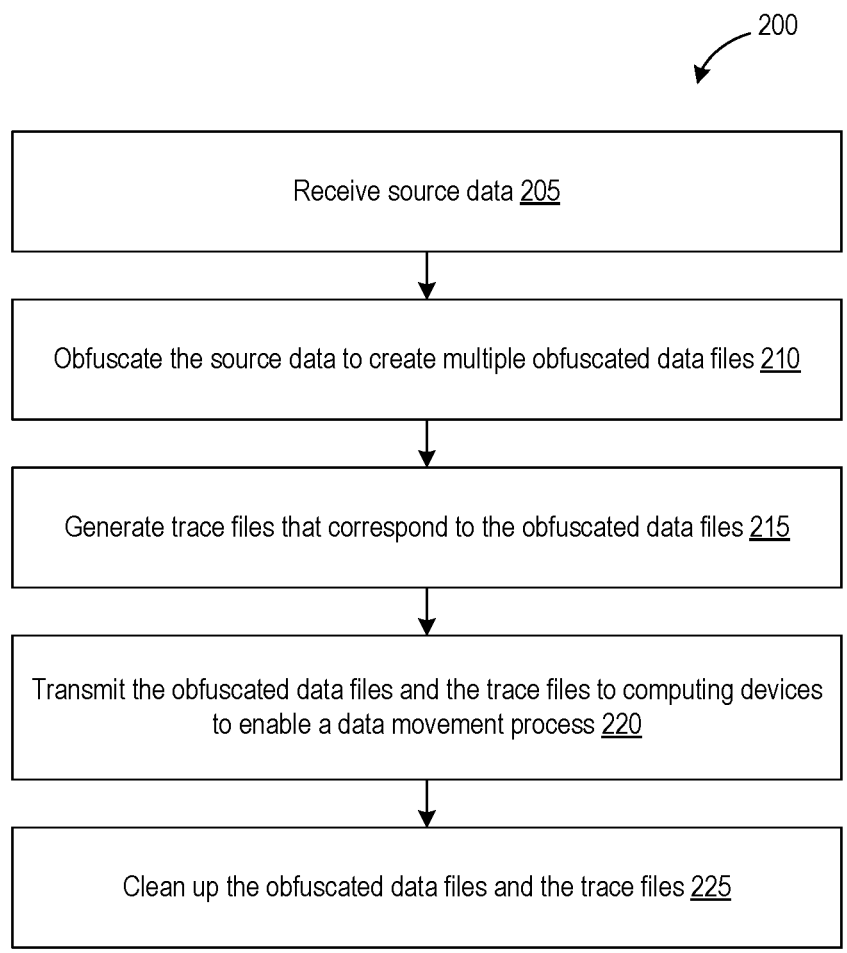
FIG. 2 is a flow diagram that illustrates a method for continuous concealment of data, consistent with various embodiments.

FIG. 2 is a flow diagram that illustrates a method for continuous concealment of data, consistent with various embodiments. The method of FIG. 2 can be executed in conjunction the various methods described herein. At block 205, a computer system receives source data. The computer system can be any type of computing device, for example, any of devices 125, 130, 155, or 180 of FIG. 1. Further, the computer system can receive the source data via any of various mechanisms. For example, another computer system can send the source data to the computer system, which receives the source data. As another example, a user can input the source data via an input mechanism of the computer system. Examples of input mechanisms include a word processor application, a spreadsheet application, a voice recognition application, an optical recognition application, a keyboard, a microphone, a camera, etc.

At block 210, the computer system obfuscates the source data to create multiple obfuscated data files. The multiple obfuscated data files can include one or more sets of obfuscated data files, where all obfuscated data files of any selected set of the obfuscated data files are needed to regenerate the source data. In some embodiments, multiple sets of obfuscated data files are created for redundancy or backup reasons. When multiple sets of obfuscated data files are created, any of the sets can be used to regenerate the source data.

Obfuscating selected data includes transforming the source data, or a version of the source data, via execution of one or more algorithms, such as a compression algorithm, a data partitioning algorithm, an encryption algorithm, a bit-scattering algorithm, a data permutation algorithm, a cyclical exclusive-or (XOR) algorithm, etc. Obfuscating source data can further include transforming the source data by adding random data to the source data or a version of the source data. In some embodiments, the encryption algorithm adds a cryptographically calculated digital digest to the source data. For example, the encryption algorithm can utilize a Secure Hash Algorithm (SHA), such as the SHA-512 algorithm, which can append a cryptographically calculated digital digest to the source data.

A version of source data includes the source data or any data that is derived from the source data, such as data that is derived from the source data via execution of an algorithm that transforms the source data. Further, data that is derived from a version of the source data is itself a version of the source data. For example, each of the following is a version of source data: the source data; data generated via execution of a compression algorithm that takes as input the source data; data generated via execution of an encryption algorithm that takes as input the data generated via the execution of the compression algorithm that takes as input the selected source data.

At block 215, the computer system generates trace files that correspond to the obfuscated data files. In some embodiments, a one to one mapping exists between the obfuscated data files and the trace files, such that each trace file maps to a single obfuscated data file, and each obfuscated data file maps to a single trace file. A trace file includes information as to how the obfuscated data file to which the trace file maps was created. For example, a trace file can include information as to the particular algorithms that were run to generate the obfuscated data file to which the trace file maps, the sequencing of the particular algorithms that were run, configuration information for the particular algorithms that were run, etc. In an example, the trace file that maps to an obfuscated data file includes information that the obfuscated data file was created by initially executing a particular compression algorithm on source data, then by executing a particular permutation algorithm, then by executing a particular encryption algorithm with a particular encryption key and seed, then by executing a particular data partition algorithm with a particular set of control values, and finally by executing the particular encryption algorithm with the particular encryption key and seed.

In some embodiments, to enable a computer system to regenerate particular source data, in addition to needing access to a set of obfuscated data files that correspond to the particular source data, the computer system needs access to the trace files that correspond to the set of obfuscated data files. The obfuscated data files are needed as the obfuscated data files contain the information of the particular source data, albeit in an obfuscated form. The trace files are needed as the trace files contain information as to how the particular source data can be regenerated based on the obfuscated data files. When the obfuscated data files were created by following a certain creation process, the trace files include information that enables the creation process to be reversed, and that enables the particular source data to be regenerated based on the obfuscated data files.

A trace file can further include identifying information for the obfuscated data file to which the trace file maps. The identifying information enables the obfuscated data file to be positively identified. In some embodiments, the identifying information is a hash value that is generated by a hash algorithm based on the contents of obfuscated data file, and that is unique to the contents of the obfuscated data file. In other words, any file that contains data that is different from the data of the obfuscated data file will have a different hash value than the obfuscated data file.

At block 220, the computer system sends the obfuscated data files and the trace files to computing devices to enable a data movement process. The data movement process can be executed multiple times by multiple computing devices. In some embodiments, the computer system randomly, semi-randomly, deterministically, etc. selects a first computing device from a set of computing devices, and the computer system sends a first one of the obfuscated data files, and a trace file that maps to the first obfuscated data file, to the first computing device. The computer system similarly selects a second computing device, and sends a second one of the obfuscated data files, and a trace file that maps to the second obfuscated data file, to the second computing device. The computer system repeats this process until the computer system has sent all of the obfuscated data files, and the trace files that correspond to the obfuscated data files, to the computing devices of block 220.

When a computing device, such as the first computing device or second computing device, receives an obfuscated data file and a trace file, the computing device generates a name for the obfuscated data file, and another for the trace file. Each name can be generated in any of various ways, such as by being randomly generated, semi-randomly generated, deterministically generated, generated so as to be unique, being generated randomly but in a pre-determined fashion, etc. The computing device further obfuscates the obfuscated data file to create a modified version of the obfuscated data file and updates the trace file based on the further obfuscation.

In some embodiments, the computing device sends a pulse message. A pulse message is a message sent to a computer system to notify the computer system of a location of a trace file or an obfuscated data file, or a selected version of a trace file or an obfuscated data file. The pulse message can include an identifier for the computing device, such as an Internet Protocol (IP) address of the computing device, a name of the computing device, a Media Access Control (MAC) address of a network interface of the computing device, a serial number of the computing device or a hardware component of the computing device, etc. The identifier can enable a reduction in a time duration needed to retrieve the obfuscated data file or the trace file. The computer system can be a computer system that received an initial request to protect the source data, among others. In some embodiments, a pulse message follows a same path as was followed by a trace file or an obfuscated data file as the trace file or the obfuscated data file were moved via the data movement process.

When a user retrieves a saved file from a data store protected by the disclosed technology, a retrieving computer system can follow pulsing tracks from the selected computer system towards current locations of all trace files or obfuscated data files, and can deliver those trace files or obfuscated data files back to the retrieving computer system. The retrieving computer system can, based on information in the retrieved trace files, combine the obfuscated data files, and reverse the obfuscation process to generate the source data.

The computing device can reverse the obfuscation process to regenerate the obfuscated data file and the trace file. In embodiments where the identifying information of the trace file enables data of the obfuscated data file to be uniquely verified, such as when the identifying information is a hash value, the hash value of the trace file can be compared to a hash value calculated based on the data of the obfuscated data file.

The computing device can send the regenerated obfuscated data file and trace file to a previous computing device. The previous computing device can be a computing device from which the obfuscated data file and the trace file were received. In some embodiments, in order to un-obfuscate an obfuscated data file, the obfuscated data file needs to be sent to a particular computing device.

The data movement process that is enabled by the computer system sending the obfuscated data files and the trace files can be any of various data movement processes. As previously discussed, in order for an attacker to successfully obtain access to data protected by the disclosed technology, the attacker must first gain access to all the obfuscated data files needed to regenerate the protected data. In some embodiments, the data movement process includes randomly, semi-randomly, deterministically, etc. moving the obfuscated data files amongst a pool or set of computing devices. As a result, locating the obfuscated data files is prohibitively difficult, as any of the obfuscated data files can be located on any of the computing devices.

Further, unless an attacker can freeze all the computing devices, which can be located on networks of multiple independent businesses, it is practically impossible to obtain all of the obfuscated data files needed to regenerate particular source data. For example, where source data is obfuscated to create ten obfuscated data files, the obfuscated data files can each initially be located on ten different computing devices, a first computing device through a tenth computing device. At that time, an attacker gains access to the first computing device, and is able to obtain copies of all files on the first computing device. The attacker at a later time is able to gain access to the tenth computing device. However, the obfuscated data file that was originally at the tenth computing device has been moved to an eleventh computing device, where the obfuscated data file has been renamed with another random name, and has been encrypted once again.

As this example helps to demonstrate, unless an attacker can freeze all the computing devices at the same or substantially the same time, it becomes practically impossible to obtain copies of all of the needed obfuscated data files. In some embodiments where all of the obfuscated data files are needed to regenerate the source data, any attacker that does not possess all of the obfuscated data files is effectively prevented from successfully regenerating the source data. Further, even if an attacker were able to simultaneously freeze all the computing devices and obtain all data of a data store containing 10,000 files protected with a version of the disclosed technology, a brute force attack on the data store would have to sift through about $2^{476}$ combinations of parts, as per an earlier discussed example. Additionally, the simultaneous freeze could occur when an obfuscated data file is in the middle of being moved. In such a case, the attacker may not obtain a usable copy of the obfuscated data file, as the data that comprises the file may not be fully stored, but rather may be partially stored and partially in the process of being moved between computing devices.

Returning to FIG. 2, at block 225, the computer system cleans up the obfuscated data files and the trace files. Cleaning up a file can include any of deleting the selected file, zeroing out data of the selected file, freeing up storage space previously utilized to store the selected file, eliminating a pointer(s) to the selected file, etc.

Figure 3:
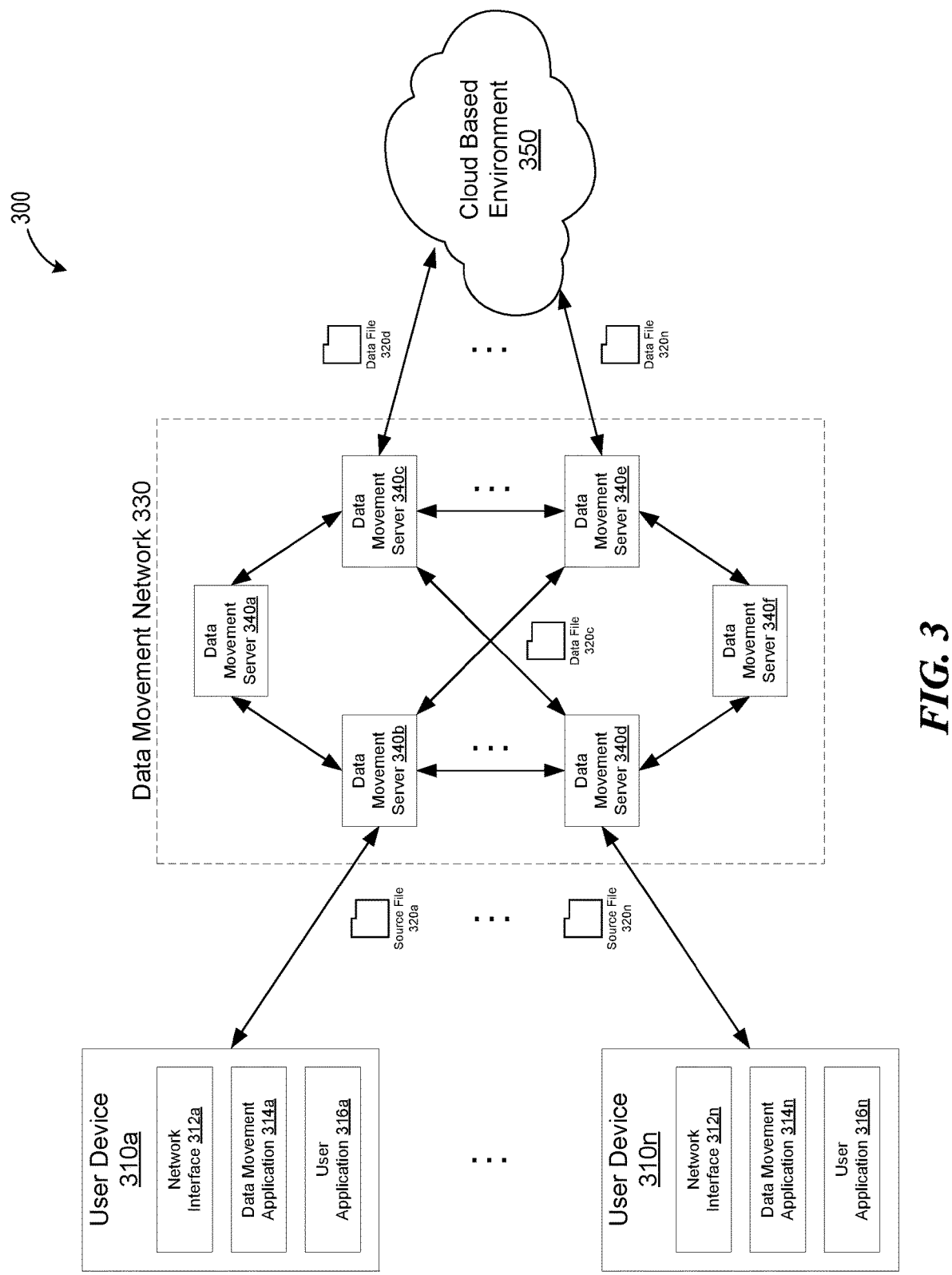
FIG. 3 is an illustration of a networking environment, consistent with various embodiments

FIG. 3 is an illustration of a networking environment 300, consistent with various embodiments. Networking environment 300 includes user devices (e.g., user devices 310a, 310n, etc., referred to collectively as "user devices 310"), data movement network 330, and cloud-based environment 350. User device 310a includes a network interface 312a, data movement application 314a, and user application 316a. The network interface 312a allows user device 310a to communicate with data movement network 330 and/or cloud-based environment 350. The data movement application 314a performs functions related to the various embodiments of the data obfuscation and data movement processes described herein. For example, user device 310a may perform data obfuscation and data movement processes to various files (e.g., source file 320a and source file 320n). User application 316a allows a user to operate user device 310a. Each user device (e.g., user device 310n) has similar components as described for user device 310a.

Data movement network 330 includes various data movement servers (e.g., data movement servers 340a, 340b, 340c, 340d, 340e, etc., referred to collectively as "data movement servers 340"). Data movement network 330 performs functions related to the various embodiments of the data obfuscation and data movement processes described herein. For example, data movement server 340b may receive source file 320a and perform various data obfuscation functions such as compressing, permutating, encrypting, or partitioning. The obfuscation functions may produce data files such as data file 325a. Data movement server 340b may transmit data file 325a or the obfuscated versions of data file 325a to other servers on data movement network 330 (e.g., data movement servers 340a, 340d, 340e, etc.). The data movement servers 340 may continuously exchange the data files (e.g., data files 325a, 325b, 325n, etc., referred to collectively as "data files 325") to provide continuous data movement within data movement network 330.

Additionally, the data movement servers 340 may transmit and receive data from cloud-based environment 350. Cloud-based environment 340 may be any cloud-computing service with varying scopes of service and control, such as a Software-as-a-Service (SaaS), Platform-as-a-Service (PaaS), or Infrastructure-as-a-Service (IaaS). A SaaS allows customers to run applications executed on servers provided by the SaaS provider. The operation of the infrastructure, such as maintenance and security, is provided by the SaaS provider with minimal involvement by the customer. A PaaS provides a computing platform where the customer may develop and deploy individual applications. A PaaS provides more control for the customer than a SaaS. A IaaS provides the basic infrastructure of network equipment and software for the customer to deploy a platform. IaaS provides yet more control for the customer than a PaaS. One common service provided by these services is remote data storage. Remote data storage provides the advantages of scalability and resiliency. Because of these advantages, customers may decide to offload their data storage to the cloud-based environment.

Returning to the data movement servers 340, data files 325 may be transmitted to and received from cloud-based environment 350. In other words, data movement servers 340 may offload data storage from data movement network 340 to cloud-based environment 350 by transmitting data files 325 to cloud-based environment 350. Additionally, data movement servers 340 may perform data movement processes with cloud environment 350. When user devices 310 or data movement servers 340 requires a data file 325 that has been offloaded, a data movement server may request the file from cloud-based environment 350.

Data movement servers 340 may utilize application programming interfaces (APIs) to transmit and receive data from cloud-based environment 350. An API defines methods of communicating between software components that may be located remotely. By using an API, applications and services can access and utilize the various functionalities provided by a cloud service. For example, applications on the data movement servers 340 may use methods defined in an API to make the proper calls to transmit data files to a server in cloud-based environment 350 or receive data files from a server in the cloud-based environment 350.

Figure 4:
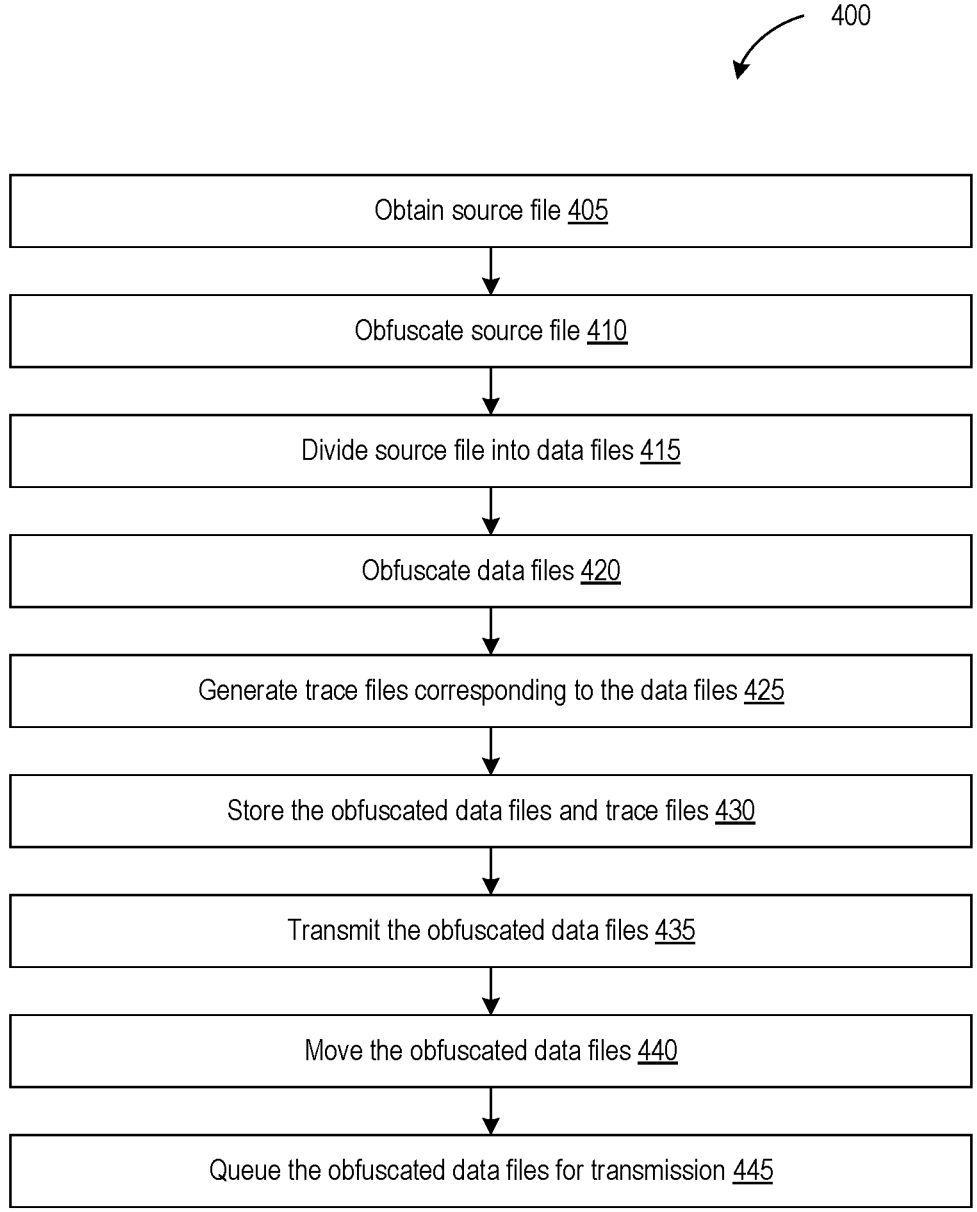
FIG. 4 is a flow diagram that illustrates a method for concealment of data in a cloud environment by data obfuscation and data movement, consistent with various embodiments.

FIG. 4 is a flow diagram that illustrates a method for concealment of data in a cloud environment by data obfuscation and data movement, consistent with various embodiments. The method of FIG. 4 can be executed in conjunction the various methods described herein. At block 405, a computer system obtains source data. The computer system can be any type of computing device, for example, any devices 125, 130, 155, or 180 of FIG. 1 or 310a, 310n, 340a, 340b, 340c, 340d, 340e, or 340f of FIG. 3, among others. Further, the computer system can receive the source data via any of various mechanisms. For example, another computer system can send the source data to the computer system, which receives the source data. As another example, a user can input the source data via an input mechanism of the computer system. Examples of input mechanisms include a word processor application, a spreadsheet application, a voice recognition application, an optical recognition application, a keyboard, a microphone, a camera, etc.

At block 410, the computer system obfuscates the source data. Obfuscating source data includes transforming the source data, or a version of the source data, via execution of one or more algorithms, such as a compression algorithm, a data partitioning algorithm, an encryption algorithm, a bit-scattering algorithm, a data permutation algorithm, a cyclical exclusive-or (XOR) algorithm, etc. Obfuscating source data can further include transforming the source data by adding random data to the source data or a version of the source data. In some embodiments, the encryption algorithm adds a cryptographically calculated digital digest to the source data. The encryption algorithm can utilize a Secure Hash Algorithm (SHA), such as the SHA-512 algorithm, which can append a cryptographically calculated digital digest to the source data. The encryption algorithm can also obfuscate a data file by applying an encryption algorithm that takes the data file and an encryption key as input, and that outputs the modified version of the obfuscated data file. In this example, the encryption key is used for encrypting data exclusively by the computing device, and is exclusive to the computing device.

For example, the computer system may compress the source data or a version of the source data by executing any of various compression algorithms, resulting in creation of a compressed version of the source data.

In some embodiments, the computer system permutes source data or a version of the source data by executing any of various permutation algorithms, resulting in creation of a permuted version of the source data. A permutation algorithm can permute data at any selected granularity, such as at the bit level, the byte level, the word level, the block level, etc. Permutation algorithms are well known in the art, as is demonstrated by http://www.cse.uconn.edu/~zshi/course/cse5302/ref/yhilewitz_thesis.pdf (an archived version of which is available at https://web.archive.org/web/20160423040108/http://www.cse.uconn.edu/~zshi/course/cse5302/ref/yhilewitz_thesis.pdf).

Permutation data files are stored in the data store along with obfuscated data files. Each obfuscated data file can have an associated permutation data file, which includes information as to how to reverse the permutation algorithm for the associated obfuscated data file. A permutation data file is stored in the data store as any other obfuscated data file or permutation data file. For source data, such as the source data received in block 205 of FIG. 2, that is partitioned into p files (e.g., block 210), each file with c copies, there can be 2*p*c associated data files in the data store. This results from each obfuscated data file having its respective permutation, travelling the store during the data movement process independently from its associated obfuscated data file or other obfuscated data files, or other permutation data files. Permutation data files can travel in substantially the same way as obfuscated data files during the data movement process, with each permutation data file being accompanied with its own trace file.

The permutation data files are not distinguishable by appearance to the computing devices, nor is the permutation data treated any differently by the computing devices than any other obfuscated data file or permutation file. When moving permutation files, computing devices send the same kind of pulse messages as are sent with obfuscated data files, and the permutation data files are retrieved together with the obfuscated data files upon data retrieval for source data regeneration. As discussed, computing devices process permutation data files and obfuscated data files in a substantially similar manner during the data movement process. However, upon retrieval of data files for source data regeneration, when an originating computer system receives the obfuscated data files and permutation data files retrieved for source data regeneration, the originating computer system uses data of the permutation data files to un-permute the data of the obfuscated data files.

The computer system may encrypt source data or a version of the source data by executing any of various encryption algorithms, resulting in creation of an encrypted version of the source data. In some embodiments, the encryption algorithm requires an encryption key or a seed in addition to the data to be encrypted. The encryption key or the seed can be exclusive to the computer system (e.g., used for encrypting data exclusively by the computer system, and not by any other computing device). For example, the encryption key and the seed can be exclusive to the computer system.

In some embodiments, the computer system encrypts the source file or versions of the source file by executing any of various encryption algorithms, resulting in creation of encrypted versions of the source file. In some embodiments, the encryption algorithm requires an encryption key or a seed in addition to the data to be encrypted. In some embodiments, the encryption key is private to the computer system (e.g., the encryption key is not used by any other computing device in the execution of an encryption algorithm).

The computer system may add randomly generated data, semi-randomly generated data, deterministically generated data, etc. to the source file or to versions of the source file by executing any of various data padding algorithms, resulting in creation of padded versions of the source file. In some embodiments where the source file are of different size, the data added by the computer system causes each of the source file to be of a same size.

The computer system may cyclically XOR the source file or versions of the source file by executing any of various cyclical XOR algorithms, resulting in creation of XORed versions of the source file. In an example, a first file and a second file of the source file are XORed to create a version of the first file, the second file and a third file of the source file are XORed to create a version of the second file, etc. In some embodiments, when two files to be XORed are not of a same size, the smaller of the two files are padded with zeros, with ones, with randomly generated data, with semi-randomly generated data, with deterministically generated data, etc. to facilitate execution of the XOR algorithm. In other embodiments, when two files to be XORed are not of a same size, only the first N bits or bytes of both files are XORed. N can equal, for example, the size of the smaller of the two files.

The computer system may bit scatter the source file or versions of the source file by executing any of various bit scatter algorithms, resulting in creation of bit scattered versions of the source file. Bit scatter algorithms are well known in the art, as is demonstrated by the previously mentioned Hilewitz reference. In some embodiments, other algorithms that obfuscate data by transforming the data are executed to create versions of the source data or of the source file. The multiple obfuscated data files can be the versions of the source file created by any obfuscation step.

At block 415, the computer system partitions source data or a version of the source data by executing any of various data partition algorithms, resulting in creation of multiple data files. A data partitioning algorithm divides input data into multiple data files, and can divide the input data such that each of the data files is needed to regenerate the input data. The input data can be partitioned in any of various ways. For example, the input data can be partitioned into even sized, random sized, semi-random sized, etc. contiguous portions, and the contiguous portions can be used to create the data files, where each data file includes a portion of the input data that is contiguous. As another example, the input data can be partitioned into non-contiguous randomly selected portions (e.g., bit, bytes, words, blocks, etc.), semi-randomly selected portions, deterministically selected portions, etc., and the selected portions can be merged to create the data files, where each data file includes non-contiguous input data.

At block 420, the computer system obfuscates some or all of the data files. The obfuscation of data files can be implemented in a manner that is consistent with the various embodiments described herein, such as those described at block 410 of FIG. 4. As such, obfuscating a data file or a version of the data file may include executing one or more algorithms, such as a compression algorithm, a data partitioning algorithm, an encryption algorithm, a bit-scattering algorithm, a data permutation algorithm, a cyclical exclusive-or (XOR) algorithm, etc. Obfuscating a data file can further include adding random data to a data file or a version of a data file. In some embodiments, the encryption algorithm adds a cryptographically calculated digital digest to a data file. The encryption algorithm can utilize a Secure Hash Algorithm (SHA), such as the SHA-512 algorithm, which can append a cryptographically calculated digital digest to a data file. The encryption algorithm can also obfuscate a data file by applying an encryption algorithm that takes the data file and an encryption key as input, and that outputs the modified version of the obfuscated data file. In this example, the encryption key is used for encrypting data exclusively by the computing device, and is exclusive to the computing device.

At block 425, the computer system generates trace files corresponding to the data files. The generation of trace files can be implemented in a manner that is consistent with the various embodiments described herein, such as those described at block 215 of FIG. 2. In some embodiments, a one to one mapping exists between the obfuscated data files and the trace files, such that each trace file maps to a single obfuscated data file, and each obfuscated data file maps to a single trace file. A trace file includes information as to how the obfuscated data file to which the trace file maps was created. For example, a trace file can include information as to the particular algorithms that were run to generate the obfuscated data file to which the trace file maps, the sequencing of the particular algorithms that were run, configuration information for the particular algorithms that were run, etc. In an example, the trace file that maps to an obfuscated data file includes information that the obfuscated data file was created by initially executing a particular compression algorithm on source data, then by executing a particular permutation algorithm, then by executing a particular encryption algorithm with a particular encryption key and seed, then by executing a particular data partition algorithm with a particular set of control values, and finally by executing the particular encryption algorithm with the particular encryption key and seed.

In some embodiments, to enable a computer system to regenerate a particular source data, in addition to needing access to a set of obfuscated data files that correspond to the particular source data, the computer system needs access to the trace files that correspond to the set of obfuscated data files. The obfuscated data files are needed as the obfuscated data files contain the information of the source data, albeit in an obfuscated form. The trace files are needed as the trace files contain information as to how the source data can be regenerated based on the obfuscated data files. When the obfuscated data files were created by following a certain creation process, the trace files include information that enables the creation process to be reversed, and that enables the source data to be regenerated based on the obfuscated data files.

A trace file can further include identifying information for the obfuscated data file to which the trace file maps. The identifying information enables the obfuscated data file to be positively identified. In some embodiments, the identifying information is a hash value that is generated by a hash algorithm based on the contents of obfuscated data file, and that is unique to the contents of the obfuscated data file. In other words, any file that contains data that is different from the data of the obfuscated data file will have a different hash value than the obfuscated data file.

At block 430, the computer system stores the obfuscated data files and corresponding trace files. In some embodiments, the data files and trace files may be stored locally on the computer system. The data files and trace files may also be stored on a data movement network (e.g., data movement network 330 depicted in FIG. 3) and moved among the servers of the data movement network (e.g., between data movement servers 340a, 340b, 340c, 340d, 340e, etc. as depicted in FIG. 3). The data movement process applied to the data files and trace files in the data movement network may be consistent with the various embodiments described herein, such as those described at block 220 of FIG. 2.

At block 435, the obfuscated data files may be transmitted to a cloud-based location. In some embodiments, a cloud-based location is a remote data storage provided by a cloud service, such as an SaaS, PaaS, or IaaS. For example, applications running on data movement servers 340 may utilize application programming interfaces (APIs) to transmit and receive data from cloud-based environment 350. The applications may make a API call to transmit the data files. Similarly, the applications may make an API call to receive requested data files and trace files.

At block 440, the computer system moves the obfuscated data files. In some embodiments, the data files may be moved from one cloud-based location to another cloud-based location within a cloud-based environment. In other embodiments, the data files may be moved between two different cloud-bases environment. The movement of data files can be implemented in a manner that is consistent with the various embodiments described herein, such as those described in FIG. 5.

At block 445, the computer system queues the obfuscated data files for later transmission. In some embodiments, the queue ensures that data files that failed to transmit to a cloud-based location are saved for subsequent re-transmission attempts. The queue may be implemented for rate-control, such that transmission attempts are made at a controlled rate to the cloud-based environment or service. For example, the queue may implement a rate of transmission that maximizes throughput and/or minimizes errors. In some embodiments, the queue may be organized in a first-in-first-out order, or may be organized based upon the priority of the data files. Additionally, the queue may be paused in order for the computer system to process retrieval requests from a user.

Figure 5:
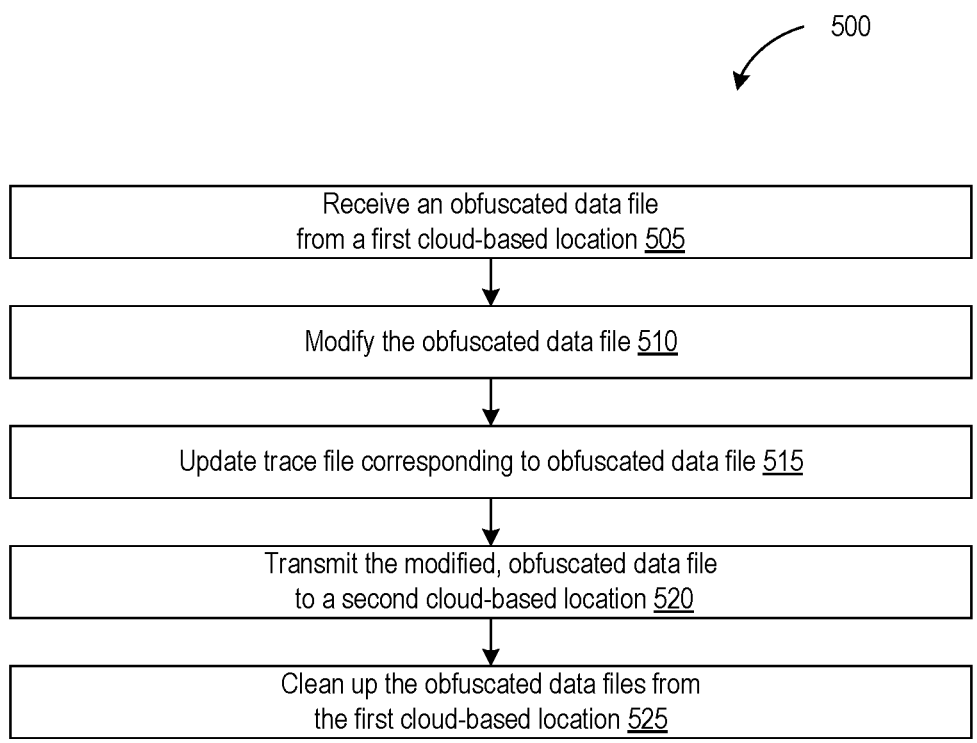
FIG. 5 is a flow diagram that illustrates a method for moving data in a cloud environment, consistent with various embodiments.

FIG. 5 is a flow diagram that illustrates a method for moving data in a cloud environment, consistent with various embodiments. The method of FIG. 5 can be executed in conjunction the various methods described herein. Additionally, the data movement process can be executed multiple times, repeatedly, and/or continuously for a given source file, data file, or trace file. Additionally, the data movement process may be executed for a plurality of source files, data files, or trace files.

At block 505, a computer system receives an obfuscated data file from a first cloud-based location. The obfuscated data file may have been previously obfuscated using an obfuscation process consistent with block 420 of FIG. 4 and transmitted to the first cloud-based location using a process consistent with block 435 of FIG. 4. In another example, the computer system may request the obfuscated data file. The transmission, reception, request or other data movement operation may be implemented using an API call consistent with the various embodiments described herein.

At block 510, the computer system modifies the downloaded obfuscated data file. For example, the obfuscation data file may be renamed, resized, encrypted, compressed, or by any process consistent with the obfuscation step described at block 420 of FIG. 4. In some embodiments, the renaming may include using a randomly selected name. The randomly selected names are generated so as to be unique, such as a randomly generated cryptographic name. For example, a name can be cryptographically generated based on an encryption key or seed. In other embodiments, the randomly selected names are generated randomly, but in a pre-determined fashion. In yet other embodiments, the obfuscated data file is intelligently renamed.

At block 515, the computer system updates the trace file corresponding to the obfuscated data file. The update of the trace file enables the obfuscation to be reversed, such that the obfuscated data file received can be regenerated. In an example, the computing device updates the trace file with encryption information that enables the encryption to be reversed. The trace file can further be updated with identifying information for the modified version of the obfuscated data file, such as a hash value of the modified version of the obfuscated data file. The identifying information enables the modified version of the obfuscated data file to be positively identified. For example, the trace file can be updated with information as to the particular encryption algorithm used, any parameters that were used by the encryption algorithm, information as to the encryption key used, a hash value that is generated by a hash algorithm based on the contents of the modified version of the obfuscated data file and that enables positive identification of the modified version of the obfuscated data file, etc. The computing device then obfuscates the trace file to create a modified version of the trace file.

At block 520, the computer system transmits the modified data file. The transmission of the modified data files can be implemented in a manner that is consistent with the various embodiments described herein, such as those described at block 435 of FIG. 4.

At block 525, the computer system cleans up the obfuscated data file from the first cloud-based location. Cleaning up a file can include any of deleting the selected file, zeroing out data of the selected file, freeing up storage space previously utilized to store the selected file, eliminating a pointer(s) to the selected file, etc.

Figure 6:
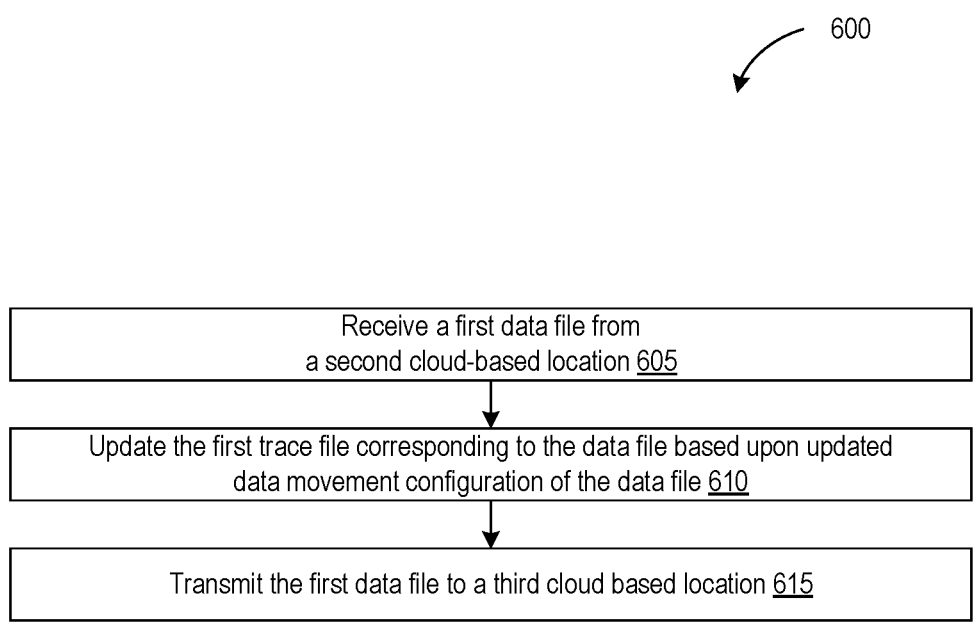
FIG. 6 is a flow diagram that illustrates a method for reconfiguring the data movement process, consistent with various embodiments.

FIG. 6 is a flow diagram that illustrates a method for reconfiguring the data movement process, consistent with various embodiments. The method of FIG. 6 can be executed in conjunction the various methods described herein. At block 605, a computer system receives a data file from a second cloud-based location. The reception of the data file can be implemented in a manner that is consistent with the various embodiments described herein, such as those described at block 505 of FIG. 5.

At block 610, the computer system updates the trace file corresponding to the data file. The step updates information based upon updated data movement configurations of the data file. For example, the trace file can be updated with parameters indicating the rate in which the data file should be moved between different cloud-based locations. Additionally, the trace file can be updated with parameters indicating the number of data files that should be generated when a source file is partitioned. The step of updating the trace file may be implemented in an update process consistent with various embodiments, such as block 515 of FIG. 5.

At block 615, the computer system transmits the data file to a third cloud-based location. The transmission of the data file can be implemented in a manner that is consistent with the various embodiments described herein, such as those described at block 435 of FIG. 4.

Figure 7:
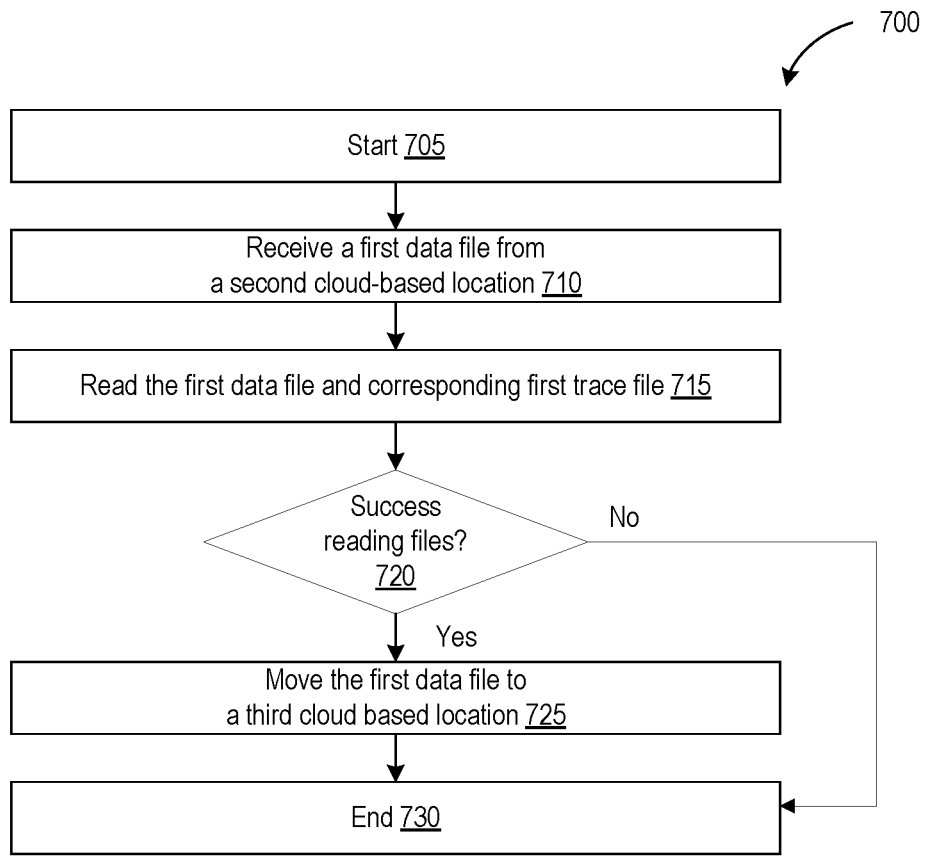
FIG. 7 is a flow diagram that illustrates a method for verifying the integrity of data in a data movement process in a cloud environment, consistent with various embodiments.

FIG. 7 is a flow diagram that illustrates a method for verifying the integrity of data in a data movement process in a cloud environment, consistent with various embodiments. The method of FIG. 7 can be executed in conjunction the various methods described herein. At block 710, a computer system receives a first data file from a second cloud-based location. The reception of the data file can be implemented in a manner that is consistent with the various embodiments described herein, such as those described at block 505 of FIG. 5.

At block 715, the computer system reads the received data file. At block 720, the computer system determines whether the data file was successfully read. For example, the data file may be successfully read if it the computer system is able to un-compress the data file, decrypt the data file, verify a checksum value, or pass other data integrity processes.

If the computer system successfully reads the data file as determined in step 720, the computer system moves the first data file to a third cloud-based location at block 725 and ends the data verification process at block 730. If the computer system unsuccessfully read the data file as determined in step 720, then computer system ends the data verification process at block 730. The computer system may also clean up the verified file in a manner that is consistent with the various embodiments described herein, such as those described at block 525 of FIG. 5.

Figure 8:
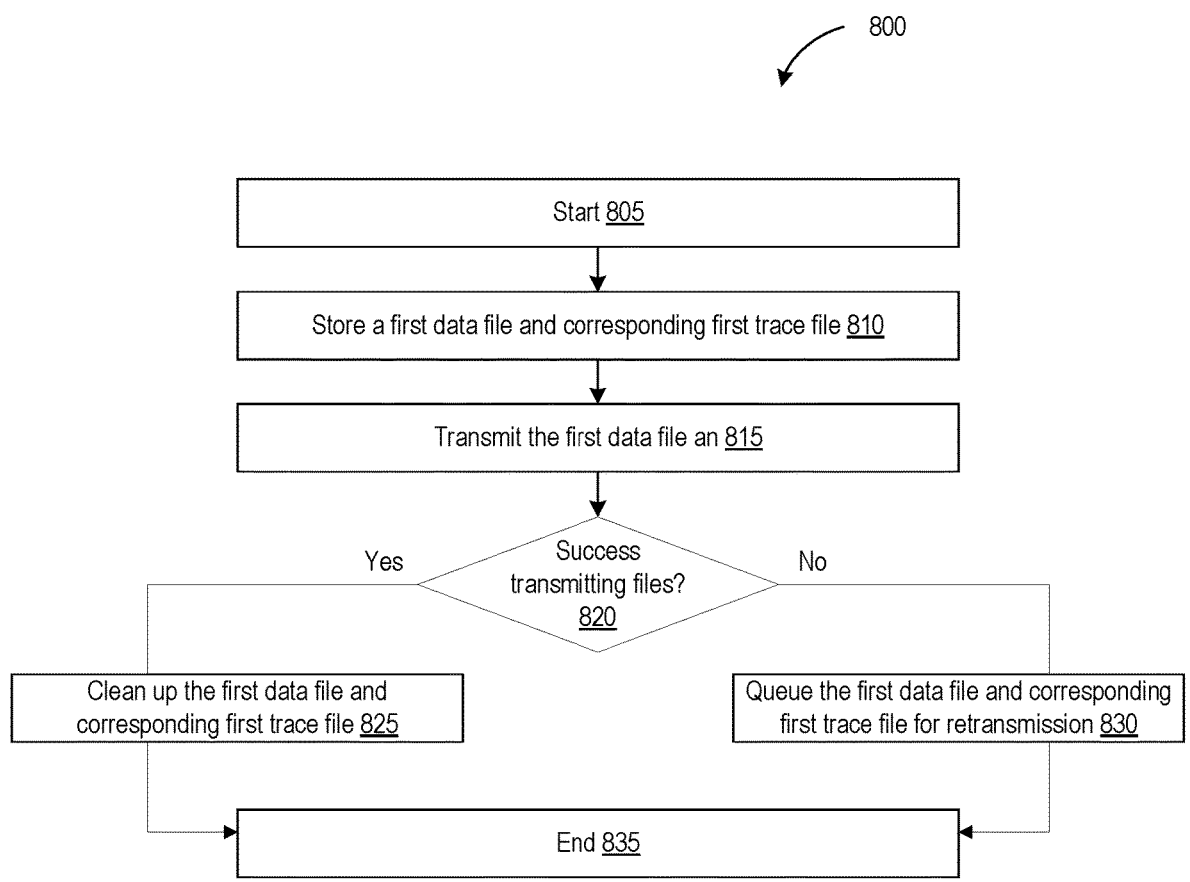
FIG. 8 is a flow diagram that illustrates a method for queuing transmissions on the computer system, consistent with various embodiments.

FIG. 8 is a flow diagram that illustrates a method for queuing transmissions on the computer system, consistent with various embodiments. The method of FIG. 8 can be executed in conjunction the various methods described herein. At block 810, a computer system stores the obfuscated data files and corresponding trace files. The storing of the obfuscated data files can be implemented in a manner that is consistent with the various embodiments described herein, such as those described at block 430 of FIG. 4.

At block 815, the computer system transmits the obfuscated data file to a cloud-based location. In some embodiments, a cloud-based location is a remote data storage provided by a cloud service, such as an SaaS, PaaS, or IaaS. The transmission of the obfuscated data files can be implemented in a manner that is consistent with the various embodiments of transmission to a cloud-based location, such as those described at block 435 of FIG. 4.

At block 820, the computer system determines whether the data file was successfully transmitted. In some embodiments, the recipient may confirm that the transmission was successful, or the computer system may download the transmitted data file from the recipient to check its integrity. For example, the computer system may attempt to download the transmitted data file and un-compress the data file, decrypt the data file, verify a checksum value, or run other data integrity processes.

At block 825, the computer system cleans up the data file and corresponding trace file if the data file was successfully transmitted as determined at block 820. Cleaning up a file can include any of: deleting the selected file, zeroing out data of the selected file, freeing up storage space previously utilized to store the selected file, eliminating a pointer(s) to the selected file, etc.

At block 830, the computer system queues the data file for later transmission. In some embodiments, the queue ensures that data files that failed to transmit to a cloud-based location are saved for subsequent re-transmission attempts. The queue may be implemented for rate-control, such that transmission attempts are made at a consistent rate to the cloud-based environment or service. In some embodiments, the queue may be organized in a first-in-first-out order, or may be organized based upon the priority of the data files. Additionally, the queue may be paused in order for the computer system to process retrieval requests from a user. The method ends at block 835.

Figure 9:
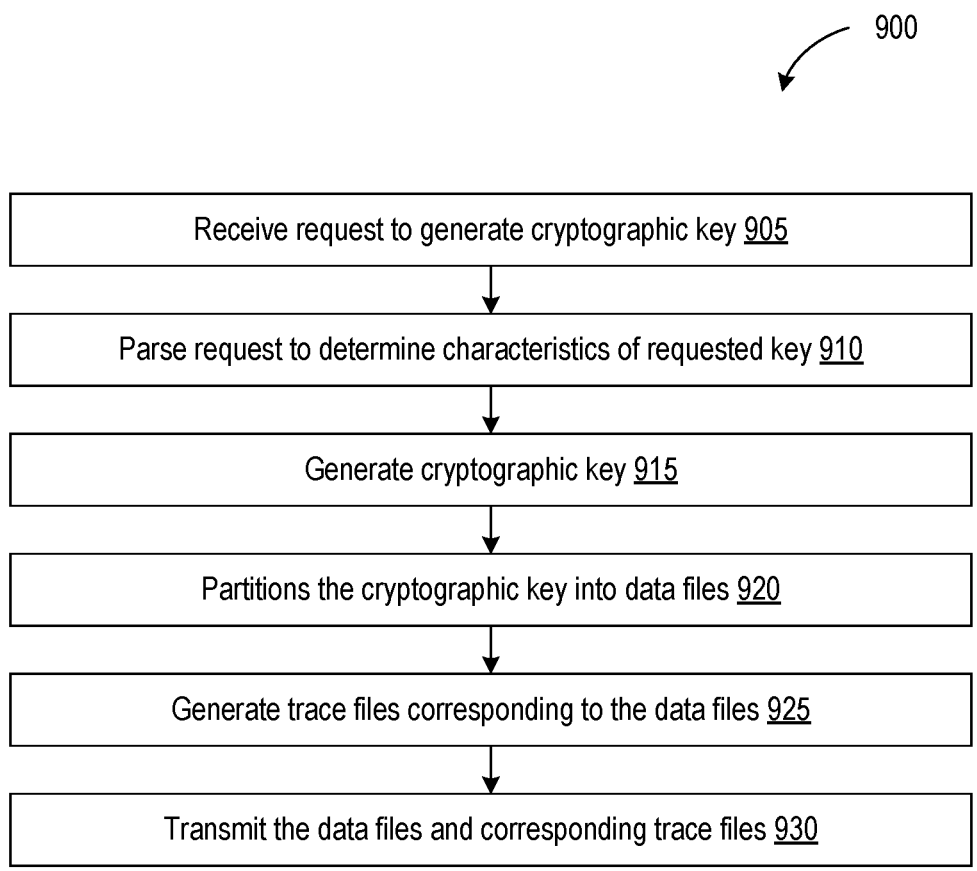
FIG. 9 is a flow diagram that illustrates a method for cryptographic key management using a data movement process, consistent with various embodiments.

FIG. 9 is a flow diagram that illustrates a method for cryptographic key management using a data movement process, consistent with various embodiments. The method of FIG. 9 can be executed in conjunction the various methods described herein. At block 905, a computer system receives a request to generate a cryptographic key. A cryptographic key may be used to perform identification verification, encryption, authentication, and authorization functions. For example, cryptographic keys may be used to authorize access to network or cloud-based services. In another example, cryptographic keys may be used to authenticate user identity or device identity. This may be useful when user devices or servers must determine the validity of API calls. In another example, keys are necessary for a sender and receiver to encrypt and de-crypt, respectively, a secure data transmission. In some embodiments, the request may be based on user input received from a command line interface (CLI) or graphic user interface (GUI). In other embodiments, the request may be generated from applications that need new cryptographic keys.

At block 910, the computer system parses the request to determine the parameters of the requested key. For example, the request may request the number of keys needed, the duration that the key is active, or the type of key needed. The types of keys include private signature keys, public signature keys, encryption keys, symmetric authentication keys, public authentication keys, etc. The request may be received as user input entered in the computer system or from a remote system.

At block 915, the computer system generates the key according to the parameters determined at block 910. The key may be generated using API defined calls. For example, the keys may be generated using Public-Key Cryptography Standards (PKCS) application programming interface (API). PKCS may be used for key management functions, such as with hardware security modules (HSM). Therefore, by using PKCS, the computer system may provide the functionality offered by HSMs.

At block 920, the computer system partitions the generated key by executing any of various data partition algorithms, resulting in creation of multiple data files. The computer system may retrieve the generated keys using a PKCS API call. Then the retrieved key may be partitioned implemented in a manner that is consistent with the various embodiments described herein, such as those described at block 415 of FIG. 4.

At block 925, the computer system generates trace files corresponding to the data files. The generation of trace files can be implemented in a manner that is consistent with the various embodiments described herein, such as those described at block 215 of FIG. 2 or block 425 of FIG. 4.

At block 930, the computer system transmits the data files. In some embodiments, the data files are transmitted to a data movement network such as data movement network 330 of FIG. 3, a cloud-based environment such as cloud-based environment 350 of FIG. 3, or a combination of both. The transmission of the data files can be implemented in a manner that is consistent with the various embodiments of transmission described herein, such as those described at block 220 of FIG. 2 and block 435 of FIG. 4.

Figure 10:
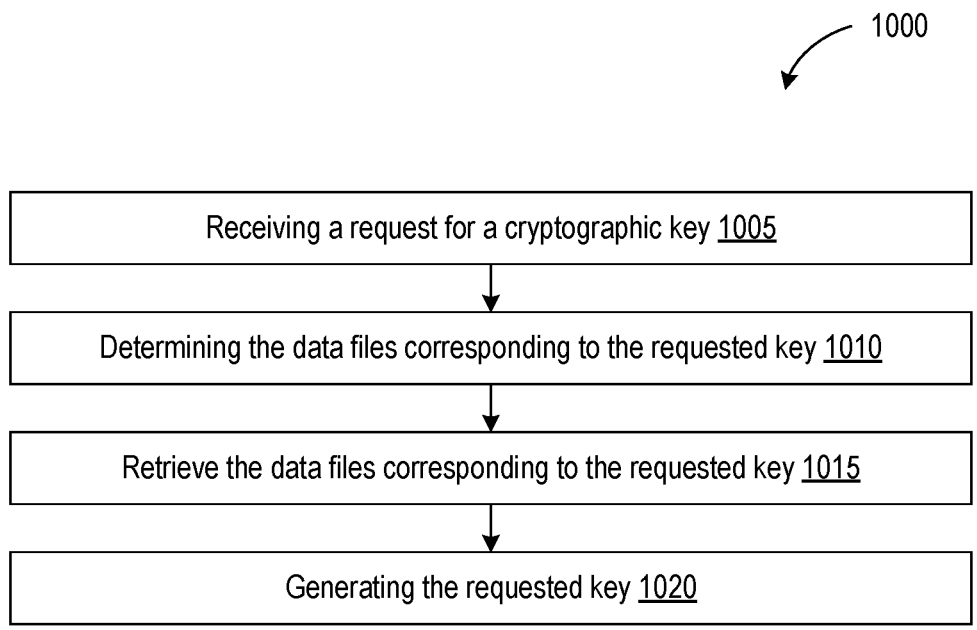
FIG. 10 is a flow diagram that illustrates a method for retrieving an existing key, consistent with various embodiments.

FIG. 10 is a flow diagram that illustrates a method for retrieving an existing key, consistent with various embodiments. The method of FIG. 10 can be executed in conjunction the various methods described herein. At block 1005, a computer system receives a request to generate a cryptographic key. In some embodiments, the request may be based on user input received from a command line interface (CLI) or graphic user interface (GUI). In other embodiments, the request may be generated from applications that need new cryptographic keys.

At block 1010, the computer system determines the data files corresponding to the requested key. In some embodiments, the determination is made by comparing hash values of the requested key with the hash values of various trace files. The determination of the data files corresponding to the requested key can be implemented in a manner that is consistent with the various embodiments described herein, such as those described in FIG. 11.

At block 1015, the computer system retrieves the data files corresponding to the requested key. The retrieval of the data files corresponding to the requested key can be implemented in a manner that is consistent with the various embodiments described herein, such as those described in FIG. 11.

At block 1020, the computer system generates the requested key using the retrieved data files. The generation of the requested key can be implemented in a manner that is consistent with the various embodiments described herein, such as those described in FIG. 11.

Figure 11:
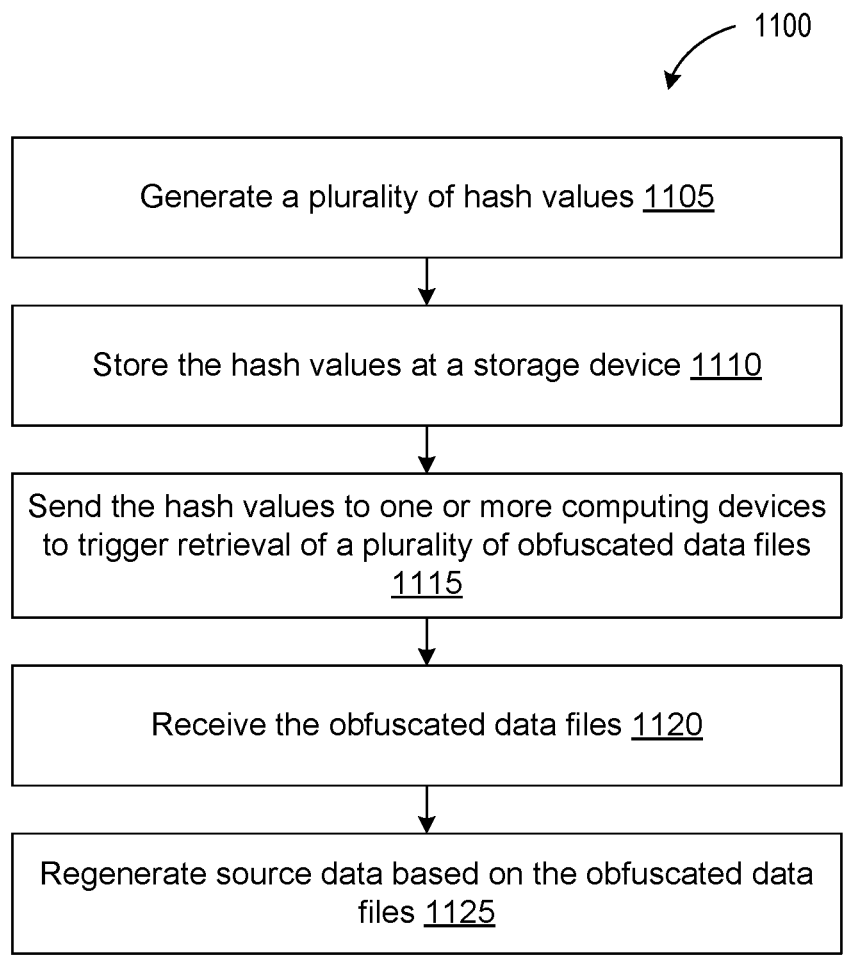
FIG. 11 is a flow diagram that illustrates a method for regenerating partitioned data, consistent with various embodiments.

FIG. 11 is a flow diagram that illustrates a method for regenerating partitioned data, consistent with various embodiments. The method of FIG. 6 can be executed in conjunction the various methods described herein. At block 1105, a computer system generates a plurality of hash values. The hash values can be the identifying information that is included, in some embodiments, in the trace files generated. Each of the hash values is generated by executing a hash algorithm based on contents of the a different one of the data files.

At block 1110, the computer system stores the hash values at a storage device. The hash values can be stored in any of various ways. For example, the hash values can be stored in one or more files, in a database, etc. The one or more files, or the database can be encrypted or otherwise obfuscated.

At block 1115, the computer system sends the hash values to computing devices. In some embodiments, such as embodiments where the computer system receives pulse messages, the computer system sends one or more of the hash values to a computing device based on an identifier received via a pulse message. The identifier can uniquely identify the computing device that sent the pulse message that included the identifier.

When a particular computing device receives a hash value, the computing device can compare the hash value to the hash value of any of the trace files to which the computing device has access. When the received hash value matches the hash value of a trace file, the computer system can initiate a process to return the obfuscated data file that maps to the trace file to the computer system. Because the obfuscated data file is being moved as part of a data movement process that adds an additional layer of obfuscation with each data move, the process of returning the obfuscated data file can follow the data movement process, but in reverse.

At block 1120, the computer system receives the obfuscated data files, and the trace files associated with the obfuscated data files. At block 1125, the computer system regenerates the source data based on the obfuscated data files and the trace files. Because a trace file includes information as to how the obfuscated data file to which the trace file maps was created, the computer system can use the information of the trace file to reverse an obfuscation process for the obfuscated data file that maps to the trace file.

Figure 12:
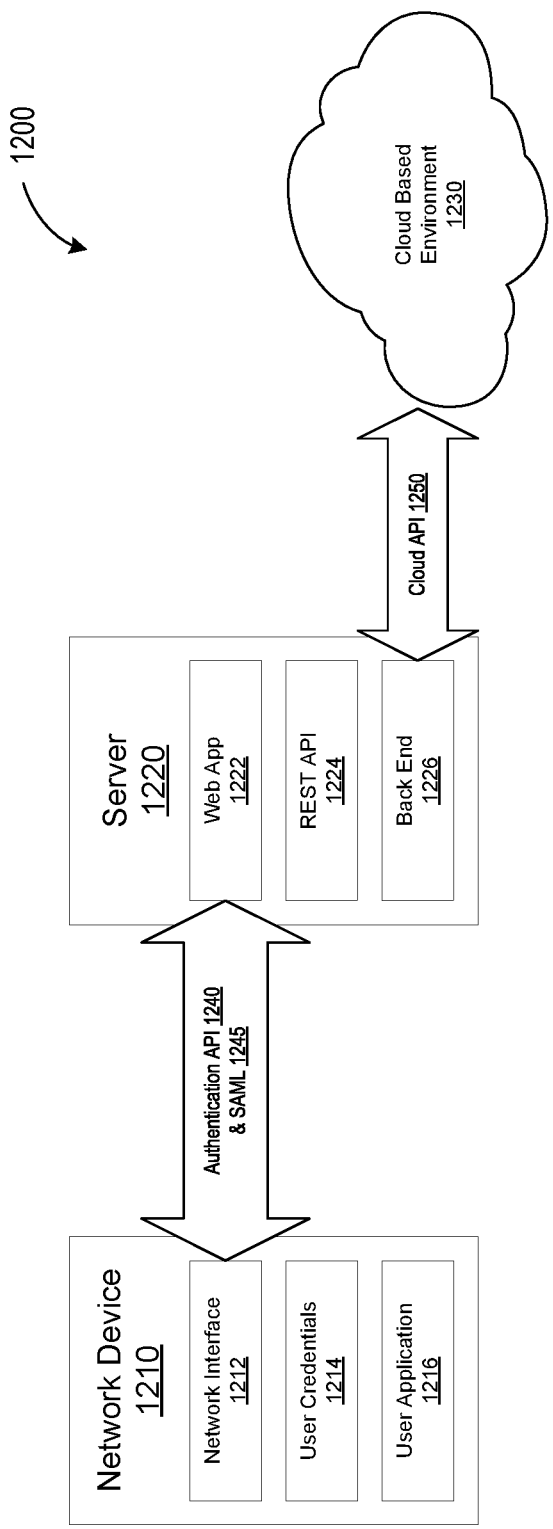
FIG. 12 is an illustration of a networking environment, consistent with various embodiments.

FIG. 12 is an illustration of a networking environment 1200, consistent with various embodiments. Networking environment 1200 includes computer device 1210, server 1220, and cloud-based environment 1230.

Computer device 1210 includes network interface 1212, user credentials 1214, and user application 1216. User interface 1212 allows computer device 1210 to communicate with server 1220 and/or cloud-based environment 1230. User credentials 1214 stores and provides user information that identifies and authenticates the user of computer device 1210. The identity and authentication is important when communicating data with server 1220 and cloud-based environment 1230. User application 1216 allows the user to access the functionality of computer device 1210, the services provided by server 1220, and cloud-based environment 1230. For example, the user application may provide a command line interface (CLI) or graphic user interface (GUI).

Server 1220 includes a web app 1222, REST API 1224, and back end system 1226. The web app 1222 facilitates a web-based interface for using the services provided by server 1220. For example, user application 1216 may be a web browser that accesses web app 1222 that functions as a web server. REST API 1224 is a Representational State Transfer (REST) service that offers interoperability between different computer systems on a network, such as computer device 1210, server 1220, and cloud-based environment 1230. In some embodiments, REST provides web-based services where speed and reliability are important. Back end 1226 provides functionality that allows communication between server 1220 and cloud-based environment 1230. For example, back end 1226 generates API calls for access cloud-based services such as remote data storage hosted on cloud-based environment 1230.

Computer device 1210 and server 1220 may communicate using authentication API 1240 and SAML 1245. Authentication API 1240 and SAML 1245 allows server 1220 to authenticate the user of network device 1210. In some embodiments, authentication API 1240 and SAML 1245 utilizes user credentials 1214 for authentication. For example, SAML 1245 uses Security Assertion Markup Language (SAML) to exchange authentication information.

Server 1220 and cloud-based environment 1230 may communicate using cloud API 1250. In some embodiments, server 1220 may use a cloud API to transmit and receive data according to the various embodiments described herein. An API defines methods of communicating between software components that may be located remotely. By using an API, applications and services can access and utilize the various functionalities provided by a cloud service. For example, applications on server 1220 may use methods defined in an API to make the proper calls to transmit data files to a server in cloud-based environment 1230 or receive data files from a server in the cloud-based environment 1230.

Figure 13:
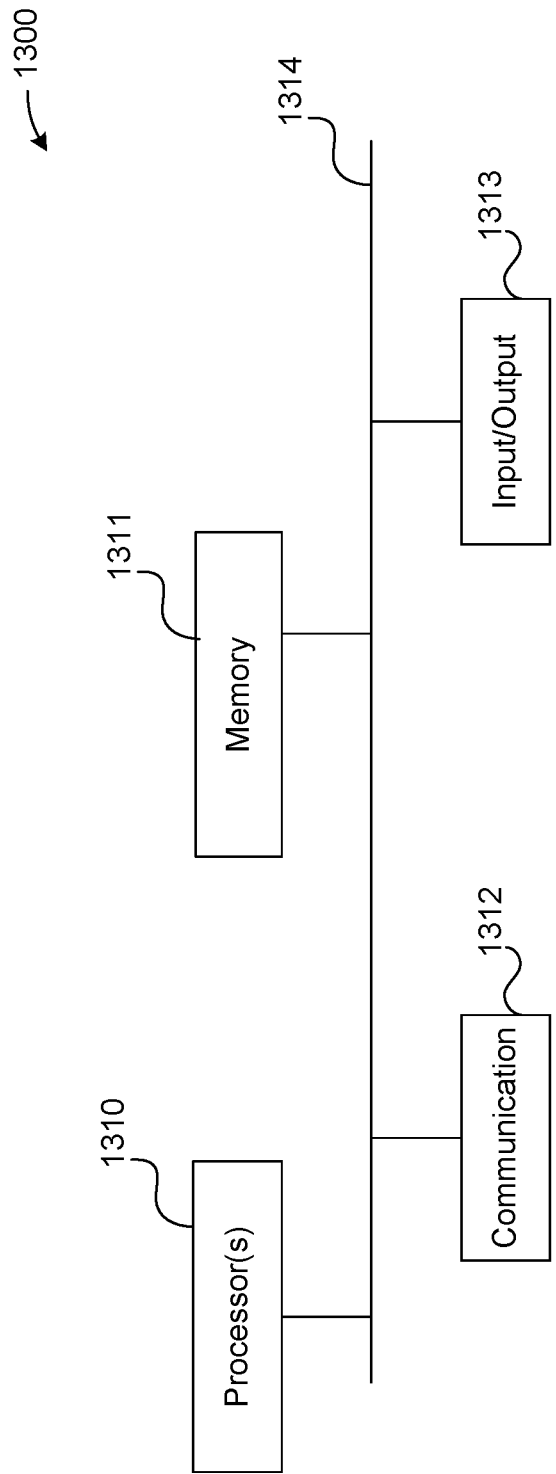
FIG. 13 is a high-level block diagram illustrating an example of a processing system in which at least some operations described herein can be implemented, consistent with various embodiments.

FIG. 13 is a high-level block diagram illustrating an example of a processing system in which at least some operations described herein can be implemented, consistent with various embodiments. The processing system can be processing device 1300, which represents a system that can run any of the methods/algorithms described above. A system may include two or more processing devices such as represented in FIG. 13, which may be coupled to each other via a network or multiple networks. A network can be referred to as a communication network.

In the illustrated embodiment, the processing device 1300 includes one or more processors 1310, memory 1311, a communication device 1312, and one or more input/data (I/O) devices 1313, all coupled to each other through an interconnect 1314. The interconnect 1314 may be or include one or more conductive traces, buses, point-to-point connections, controllers, adapters and/or other conventional connection devices. Each of the processors 1310 may be or include, for example, one or more general-purpose programmable microprocessors or microprocessor cores, microcontrollers, application specific integrated circuits (ASICs), programmable gate arrays, or the like, or a combination of such devices. The processor(s) 1310 control the overall operation of the processing device 1300. Memory 1311 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1311 may store data and instructions that configure the processor(s) 1310 to execute operations in accordance with the techniques described above. The communication device 1312 may be or include, for example, an Ethernet adapter, cable modem, Wi-Fi adapter, cellular transceiver, Bluetooth transceiver, or the like, or a combination thereof. Depending on the specific nature and purpose of the processing device 1300, the I/O devices 1313 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 1300 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 14:
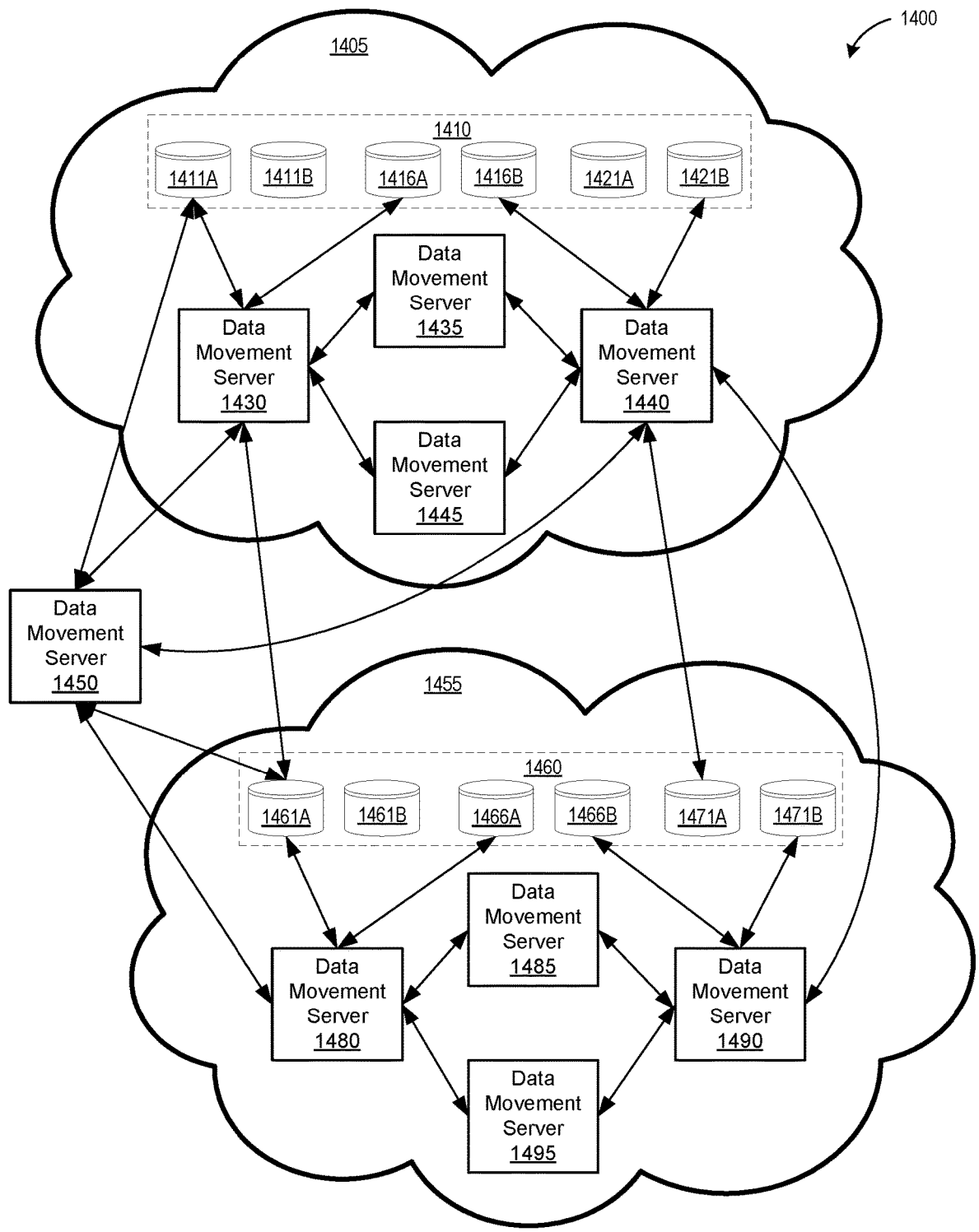
FIG. 14 is an illustration of a networking environment, consistent with various embodiments.

FIG. 14 is an illustration of a cloud-based environment 1400, consistent with various embodiments. Cloud-based environment 1400 includes cloud service providers 1405 and 1455, data management servers (e.g., data management servers 1430, 1435, 1440, 1445, 1450, 1480, 1485, 1490, and 1495), and cloud-based storage container groups 1410 and 1460 (the storage container groups include storage containers 1411A, 1411B, 1416A, 1416B, 1421A, 1421B, 1461A, 1461B, 1466A, 1466B, 1471A, and 1471B).

Cloud service providers 1405 and 1455 are service providers that facilitate cloud computing. In cloud computing, users of the service have access to a pool of resources that are accessible via a data network. The shared resources may be scaled to a very large pool to provide service to many users. Due to this scalability, cloud computing offers robust security, redundancy, and availability for users. Cloud service providers 1405 and 1455 provide cloud-computing service with varying scopes of service and control. The scopes of service and user control vary depending on whether the service provider provides a Software-as-a-Service (SaaS), Platform-as-a-Service (PaaS), or Infrastructure-as-a-Service (IaaS).

Cloud-Based Data Management Servers

Cloud service providers 1405 and 1455 provide cloud-based, on-demand services such as facilitating computing operations on data management servers 1430, 1435, 1440, 1445, 1480, 1485, 1490, and 1495. The data management servers may perform functions related to the various embodiments of the data obfuscation and data movement processes described herein. In some embodiments, the data movement servers in the cloud-based environment 1400 perform data obfuscation and data movement operations that are consistent with the operations described for the user devices and/or servers of FIG. 3. Examples of cloud service providers that provides cloud computing services include Amazon AWS®, Microsoft Azure®, and Google Cloud®.

In some embodiments, an example of data obfuscation and data movement processes in cloud environment 1400, data movement server 1430 may obtain a source file or receive a data file. The data movement server 1430 then partitions the file and obfuscates the partitioned data in a manner consistent with the obfuscation functions described herein. Data movement server 1430 subsequently sends the obfuscated or modified data to other servers. For example, data movement server 1430 may send the obfuscated or modified data to data movement server 1445 in cloud service provider 1405 or data movement server 1450 that is not provided by a cloud service provider. Data movement servers may also send the obfuscated or modified data to data movement servers in a different cloud service provider. For example, data movement server 1440 in cloud service provider 1405 may send an obfuscated or modified data to data movement server 1490 in cloud service provider 1455.

Although the examples provided describe the data obfuscation and data movement operations performed at specific data movement servers, the data movement operations described herein can be performed by any data movement server in the cloud-based environment. Additionally, the data movement servers may continuously exchange the data files to provide continuous data movement within the cloud-based environment 1400.

Cloud-Based Data Storage

Cloud service providers 1405 and 1455 also provide cloud-based, on-demand services such as facilitating data storage on cloud-based storage containers 1411A, 1411B, 1416A, 1416B, 1421A, 1421B, 1461A, 1461B, 1466A, 1466B, 1471A, and 1471B. Similar to cloud computing, data storage provides the advantages of robust security, redundancy, and availability for users. Because of these advantages, customers may decide to offload their data storage to the cloud-based environment. Examples of cloud service providers that provides data storage include Amazon S3 ®, Microsoft OneDrive®, Dropbox® and Google Drive®.

In some embodiments, data storage may be providing using storage containers. To assist users with using the data storage, cloud service providers 1405 and 1455 may provide APIs to mount the storage containers. When a storage container is mounted, the servers may access the storage container as a drive that is accessible by a server's file system. From the perspective of the server, the mounted storage container functions as a local data storage device. The API also provides the ability for users to send and retrieve data to the storage containers.

Each storage container may have configuration properties or metadata that allow functionality such as access control and geographic information. For example, a storage container may be implemented using an Amazon S3 ® bucket that users can create to organize their data. Each S3 is associated with a physical geographic region. Therefore, data stored in different buckets may be stored on data storage resources in different geographic regions. Similarly, each storage container may be implemented as a folder or other logical entities in a cloud service provider. As will be described in detail below, data movement servers may wish to move data between different storage containers. In some embodiments, movement between different storage containers may result in moving data between different geographic regions.

In an example of data obfuscation and data movement processes in cloud environment 1400, data movement server 1430 may obtain a source file or receive a data file. The data movement server 1430 then partitions the file and obfuscates the partitioned data in a manner consistent with the obfuscation functions described herein. The obfuscated or modified data of the data movement servers may be stored on the storage containers 1411A, 1411B, 1416A, 1416B, 1421A, 1421B, 1461A, 1461B, 1466A, 1466B, 1471A, and 1471B. For example, data movement server 1430 may retrieve an obfuscated data file from storage container 1411A and send a corresponding modified data file to storage container 1411B, both of which are located in cloud service provider 1405. Data movement servers may also move data files between storage containers on different cloud service providers. For example, data movement server 1440 may retrieve an obfuscated data file from storage container 1421A in cloud service provider 1405 and send a corresponding modified data file to storage container 1471A in cloud service provider 1455.

Data movement servers may also move data files between storage containers and data movement servers. For example, data movement server 1430 may obtain or receive an obfuscated data from data movement server 1450 and send a corresponding modified data file to storage containers 1411A, 1416A, and/or 1461A. In another example, data movement server 1440 may obtain or receive an obfuscated data from storage container 1421B and send a corresponding modified data file to data movement servers 1445, 1450, and/or 1490.

Although the examples provided describe the data movement operation performed at specific data movement servers and storage containers, the data movement operations described herein can be performed between any data movement server and storage container in the cloud-based environment. Additionally, the data movement servers may continuously exchange the data files to provide continuous data movement within the cloud-based environment 1400.

The data movement operation of FIG. 14 may be performed such that the operation may include movement in a forward direction and data movement in a backward operation. In one embodiment, when performing forward data movement, the data movement server randomly selects the destination to send the data files or trace files.

Additionally, the data movement operation of FIG. 14 may be performed in a manner that is consistent with the data movement operation of FIG. 5. As such, the data movement operation may include obtaining or receiving data, modifying the data, updating the corresponding trace file, and transmitting the modified data and corresponding trace file to another location in the cloud-based environment. The operation may further include cleaning up the data or trace file from the initial location. Cleaning up the data or trace file may be accomplished by any of deleting the selected file, zeroing out data of the selected file, freeing up storage space previously utilized to store the selected file, eliminating a pointer(s) to the selected file, etc.

Figure 15:
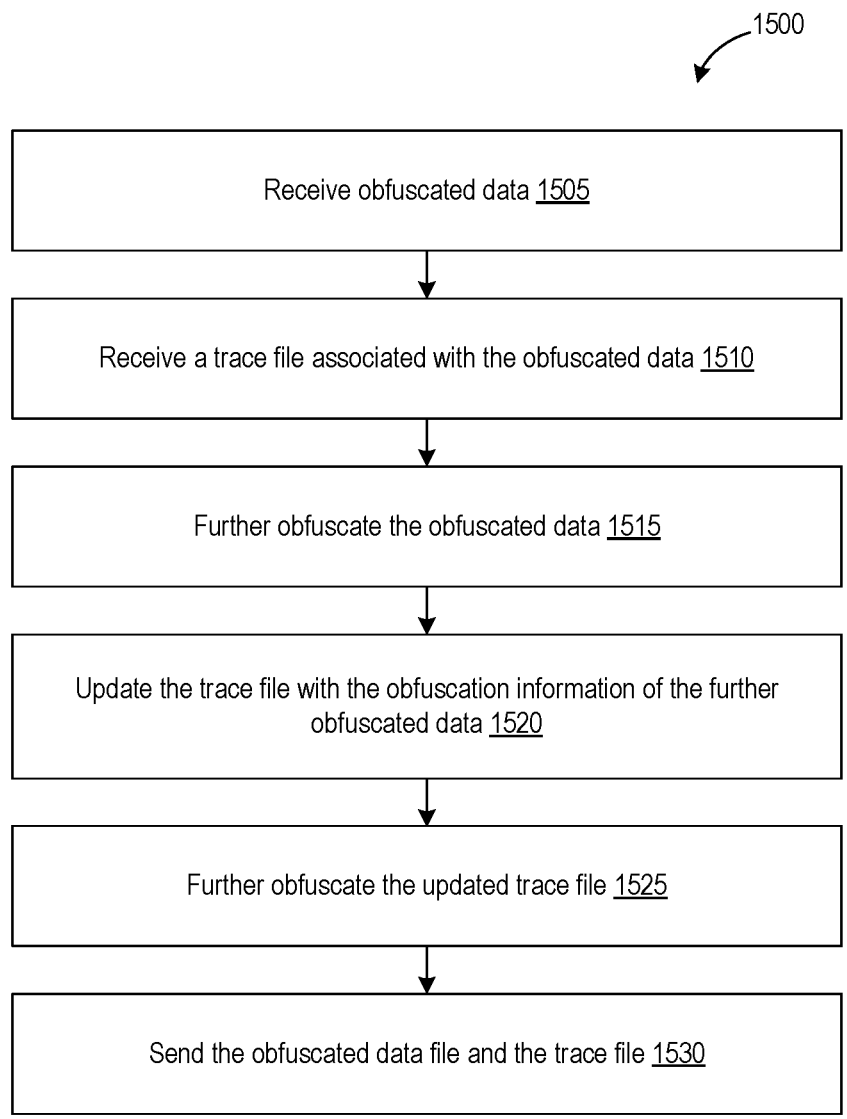
FIG. 15 is a flow diagram that illustrates a method for moving data in a cloud environment, consistent with various embodiments.

FIG. 15 is a flow diagram that illustrates a method for continuous concealment of data, consistent with various embodiments. At block 1505, a data movement server receives obfuscated data. The data movement server may be implemented in a manner consistent with data movement servers 1430, 1435, 1440, 1445, 1480, 1485, 1490, and 1495 of FIG. 14. Additionally, the data movement server receives the obfuscated data via a data network. The data network may provide data communications for a cloud-based environment consistent with cloud-based environment 1400 of FIG. 14. At block 1510, the data movement server further receives a trace file associated with the obfuscated data.

At block 1515, the data movement server further obfuscates the obfuscated data. In some embodiments, the obfuscation may be performed by executing an obfuscation operation consistent with obfuscation operations described in at least FIG. 2. At block 1520, the data movement server updates the corresponding trace file with obfuscation information. In some embodiments, the trace file may be updated in a manner that is consistent with the updating step 515 of FIG. 5.

At block 1525, the data movement server further obfuscates the updated trace file. The further obfuscation may be performed on the trace file in a manner that is consistent with obfuscation operations described in at least FIG. 2. At step 1530, the data movement server sends the obfuscated data file and corresponding trace file to another location in the cloud-based environment.

From the foregoing, it will be appreciated that specific embodiments of the technology have been described herein for purposes of illustration, but that various modifications can be made without deviating from the technology.

Certain aspects of the technology described in the context of particular embodiments may be combined or eliminated in other embodiments. Further, while advantages associated with certain embodiments of the technology have been described in the context of those embodiments, other embodiments may also exhibit such advantages, and not all embodiments need necessarily exhibit such advantages to fall with within the scope of the present disclosure. Accordingly, the present disclosure and associated technology can encompass other embodiments not expressly shown or described herein. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

I claim:

1. A system for data movement and protection, the system comprising: a first server provided by a first cloud service provider, the first server
  operating as a node in a data movement network, the first server configured to:
    obtain a source file;
    partition the source file into a plurality of data files;
    perform an obfuscation operation on each data file of the plurality of data files to create a plurality of obfuscated data files,
    generate a plurality of hash values by executing a hash algorithm on the contents of each of the obfuscated data files, each hash value identifying a corresponding obfuscated data file from the plurality of obfuscated data files;
    generate a plurality of trace files, each trace file corresponding to an obfuscated data file from the plurality of obfuscated data files and including:
      obfuscation information that enables the regeneration of the source file based on the plurality of obfuscated data files, and
      including the hash value identifying the obfuscated data file;
    perform an obfuscation operation on each trace file of the plurality of traces files to create a plurality of obfuscated trace files; and
  one or more processors configured to implement a storage container provided by the cloud service provider, the storage container associated with the first server and configured to:
    store the plurality of obfuscated data files, the plurality of hash values, and the plurality of obfuscated trace files, the stored plurality of obfuscated data files and the stored plurality of trace files are provided for transmission to a first set of servers provided by the cloud service provider; and
    clean up of the source data file, one or more of the plurality of obfuscated data files, and/or one or more of the plurality of trace files, after transmission to the other nodes in the data movement network.

2. The method of claim 1, wherein the obfuscation operation includes one or more of: encrypting the obfuscated data file, renaming each obfuscated data file using a name that is cryptographically generated, adding random data to the obfuscated data file, cyclically exclusive-or'ing (XOR'ing) the obfuscated data file, compressing the obfuscated data file, applying a permutation algorithm to the obfuscated data file, and applying a bit-scattering algorithm to the obfuscated data file.

3. The computer system of claim 1, wherein the servers in the first set of servers modify obfuscated data files received from the first server, update the corresponding trace files based upon the modification, and transmit the modified obfuscated data files and updated corresponding trace files to a second set of servers provided by the cloud service provider.

4. The computer system of claim 1, wherein the servers are configured to:
  generate a plurality of hash values by executing a hash algorithm on the contents of each of the obfuscated data files, each hash value identifying a corresponding obfuscated data file from the plurality of obfuscated data files and store each hash value identifying a corresponding obfuscated data file in the network device;
  retrieve each of the plurality of obfuscated data files and each of the plurality of trace files by transmitting the stored hash values to the plurality of network devices to trigger the transmission of the plurality of obfuscated data files from the plurality of network devices;
  regenerate the plurality of the obfuscated data files by reversing the obfuscation process on each of the obfuscated data files using the plurality of trace files and regenerate the source file by combining the plurality of regenerated data files.

5. A method for providing data security services by a first server provided by a first cloud-based service, the method comprising:
  obtaining a source file;
  partitioning the source file into a plurality of data files;
  performing an obfuscation operation on each data file of the plurality of data files to create a plurality of obfuscated data files, the obfuscation operation including one or more of: encrypting the obfuscated data file, renaming each obfuscated data file using a name that is cryptographically generated, adding random data to the obfuscated data file, cyclically exclusive-or'ing (XOR'ing) the obfuscated data file, compressing the obfuscated data file, applying a permutation algorithm to the obfuscated data file, and applying a bit-scattering algorithm to the obfuscated data file;
  generating a plurality of hash values, each hash value identifying a corresponding obfuscated data file from the plurality of obfuscated data files;
  generating a plurality of trace files, each trace file corresponding to an obfuscated data file from the plurality of obfuscated data files and enables the regeneration of the source file based on the plurality of obfuscated data files, and including the hash value identifying the obfuscated data file;
  storing the plurality of obfuscated data files and the plurality of trace files.

6. The method of claim 5, wherein the plurality of obfuscated data files and the plurality of trace files are stored in a network accessible storage container.

7. The method of claim 6, wherein the network accessible storage container is provided by the first cloud-based service.

8. The method of claim 6, wherein the network accessible storage container is provided by a second cloud-based service different from the first cloud-based service.

9. The method of claim 5, wherein the plurality of obfuscated data files and the plurality of trace files are stored in a second server provided by the first cloud-based service.

10. The method of claim 9, wherein the plurality of obfuscated data files and the plurality of trace files are stored in a second server provided by a second cloud-based service.

11. The method of claim 5, wherein the method generates the plurality of hash values by executing a hash algorithm on the contents of each of the obfuscated data files and the hash value generated and stored in the first network device.

12. The method of claim 5, wherein each trace file from the plurality of obfuscated data files includes obfuscation information regarding the obfuscation operation, the obfuscation information enabling regeneration of the source file based on the plurality of obfuscated data files, and the hash value identifying the obfuscated data file.

13. The method of claim 5, further comprising:
performing an obfuscation operation on each trace file of the plurality of trace files to create a plurality of obfuscated trace files, the obfuscation operation including one or more of: encrypting the obfuscated trace file, renaming each obfuscated trace file using a name that is cryptographically generated, adding random data to the obfuscated trace file, cyclically exclusive-or'ing (XOR'ing) the obfuscated trace file, compressing the obfuscated trace file, applying a permutation algorithm to the obfuscated trace file, and applying a bit-scattering algorithm to the obfuscated trace file.

14. The method of claim 5, further comprising:
cleaning up of the source data file, one or more of the plurality of obfuscated data files, or one or more of the plurality of trace files at the first storage container by performing on or more of the following: deleting the file, zero-ing out data of the file, freeing up storage space previously utilized to store the file, and eliminating pointers to the file.

15. A first server connected to a first cloud-based service, the first server comprising:
a processor;
a network interface coupled to the processor and configured to communicate with other servers and storage containers on the cloud-based environment; and
a memory coupled to the processor and storing instructions which, when executed by the processor, cause the computing system to:
receive, via the network interface, an obfuscated data file an obfuscated data file of a plurality of obfuscated data files derived from a source file, and a trace file of a plurality of trace files associated with the plurality of obfuscated data files;
generate a modified version of the obfuscated data file by performing an obfuscation operation on the obfuscated data file, the obfuscation operation including one or more of: encrypting the obfuscated data file, renaming each obfuscated data file using a name that is cryptographically generated, adding random data to the obfuscated data file, cyclically exclusive-or'ing (XOR'ing) the obfuscated data file, compressing the obfuscated data file, applying a permutation algorithm to the obfuscated data file, and applying a bit-scattering algorithm to the obfuscated data file;
generate a modified trace file by updating the trace file with obfuscation information regarding said further obfuscating of the obfuscated data file to enable regeneration of the source file based on the modified version of the obfuscated data file and further obfuscating the trace file; and
send, via the network interface, the modified version of the obfuscated data file and the modified version of the trace file to a node in the cloud-based environment.

16. The first server of claim 15, wherein the node is a network accessible storage container in the first cloud-based service or a second cloud-based service different from the first cloud-based service.

17. The first server of claim 15, wherein the node is a network accessible server provided by the first cloud-based service or a second cloud-based service different from the first cloud-based service.

18. The first server of claim 15, wherein the memory stores instructions executable by the processor to cause the server to:
generate a plurality of hash values by executing a hash algorithm on the contents of each of the obfuscated data files, each hash value identifying a corresponding obfuscated data file from the plurality of obfuscated data files;
store each hash value identifying a corresponding obfuscated data file in the network device;
retrieve each of the plurality of obfuscated data files and each of the plurality of trace files by transmitting the stored hash values to the plurality of network devices to trigger the transmission of the plurality of obfuscated data files from the plurality of network devices;
regenerate the plurality of the data files by reversing the obfuscation process on each of the obfuscated data files using the plurality of trace files; and
regenerate the source file by combining the plurality of regenerated data files.

19. The first server of claim 15, wherein the memory stores instructions executable by the processor to cause the server to:
compute the hash value of a regenerated data file from the plurality of regenerated data files by executing a hash algorithm on the contents of the regenerated data file;
compare the computed hash value with the hash value stored in the network device that identifies the regenerated data; and
determine whether the regenerated data file has been modified.

20. The first server of claim 15, wherein the memory stores instructions executable by the processor to cause the server to:
designate the network device that provided the regenerated data file as an un-trusted computer when the regenerated data file is determined to have been modified.

21. The first server of claim 15, wherein each of the obfuscated data files are subsequently modified, each of the corresponding trace files are updated based upon the modification, and the modified obfuscated data files and updated corresponding trace files are transmitted to a second plurality of network devices.

22. A method for securing data files via ongoing periodic movement in a cloud-based environment, the method comprising:
receiving, by a first server, an obfuscated data file of a plurality of obfuscated data files derived from a source file;
receiving, by the first server, a trace file of a plurality of trace files associated with the plurality of obfuscated data files, wherein regeneration of the source file requires data from each of the plurality of trace files and data from each of the plurality of obfuscated data files;
further obfuscating, by the first server, the obfuscated data file to create a modified version of the obfuscated data file;
updating, by the first server, the trace file with obfuscation information regarding the further obfuscating of the obfuscated data file to enable regeneration of the source file based on the modified version of the obfuscated data file;
further obfuscating, by the first server, the trace file to create a modified version of the trace file; and
sending, by the first server, the modified version of the obfuscated data file and the modified version of the trace file to a first cloud resource in the cloud-based environment.

23. The method of claim 22, wherein the obfuscated data file and the trace file are received from a first storage container in a first cloud service.

24. The method of claim 23, wherein the first cloud resource is a second storage container located in the first cloud service.

25. The method of claim 23, wherein the first cloud resource is a second storage container on a second cloud service.

26. The method of claim 24, wherein each storage container is located in a different geographic region.

27. The method of claim 23, wherein the first cloud resource is a second server on the first cloud service.

28. The method of claim 23, wherein the first cloud resource is a second server on a second cloud service.

29. The method of claim 22, wherein the obfuscated data file and the trace file are received from a second server on a first cloud service.

30. The method of claim 29, wherein the first cloud resource is a first storage container located in the first cloud service.

31. The method of claim 29, wherein the first cloud resource is a first storage container located in a second cloud service.

32. The method of claim 29, wherein the first cloud resource is a second server on the first cloud service.

33. The method of claim 29, wherein the first cloud resource is a second server on a second cloud service.

34. The method of claim 29, wherein the first cloud resource is a second server that is not provided by a cloud service.

* * * * *